United States Patent
Nick et al.

(10) Patent No.: US 8,960,726 B2
(45) Date of Patent: Feb. 24, 2015

(54) COUPLING LOCK MECHANISM

(75) Inventors: Leonard J Nick, Lucinda, PA (US); Dennis Zeiber, Erie, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 730 days.

(21) Appl. No.: 13/304,013

(22) Filed: Nov. 23, 2011

(65) Prior Publication Data
US 2013/0125377 A1 May 23, 2013

(51) Int. Cl.
F16L 55/00 (2006.01)
F16L 19/00 (2006.01)
F16L 29/04 (2006.01)

(52) U.S. Cl.
CPC ............... F16L 19/005 (2013.01); F16L 29/04 (2013.01)
USPC .................... 285/84; 285/86; 285/87; 285/92

(58) Field of Classification Search
USPC .................. 285/84, 86, 87, 88, 92
See application file for complete search history.

(56) References Cited

U.S. PATENT DOCUMENTS

| | | | |
|---|---|---|---|
| 69,706 A | 10/1867 | Roberts | |
| 455,249 A | 6/1891 | Fricker | |
| 545,066 A | 8/1895 | Fregeau | |
| 641,846 A | 1/1900 | Davenport et al. | |
| 774,362 A * | 11/1904 | McCarthy | 285/87 |
| 813,792 A * | 2/1906 | Gooch et al. | 285/88 |
| 832,757 A | 10/1906 | Stirzaker | |
| 1,033,187 A | 7/1912 | Metger | |
| 1,080,675 A | 12/1913 | Berg | |
| 1,325,468 A * | 12/1919 | Foster | 285/88 |
| 1,483,028 A * | 2/1924 | Walsh | 285/84 |
| 1,615,595 A * | 1/1927 | O'Connor | 285/88 |
| 1,785,990 A | 1/1928 | Welsh | |
| 2,158,131 A | 5/1939 | Laurent | |
| 2,183,895 A | 12/1939 | Reed | |
| 3,455,580 A | 7/1969 | Howard | |
| 3,520,563 A | 7/1970 | Decker, Jr. | |
| 3,669,472 A | 6/1972 | Nadsady | |
| 3,930,674 A | 1/1976 | Jonsson | |
| 4,268,103 A * | 5/1981 | Schildkraut et al. | 285/88 |
| 4,552,427 A | 11/1985 | Landgreen | |
| 4,624,483 A | 11/1986 | Stromberg | |
| 4,648,630 A | 3/1987 | Bruch | |
| 4,648,670 A | 3/1987 | Punako et al. | |
| 4,671,540 A | 6/1987 | Medvick et al. | |
| 4,776,614 A * | 10/1988 | Marrison et al. | 285/87 |
| 4,802,694 A | 2/1989 | Vargo | |
| 4,875,715 A | 10/1989 | Dennany et al. | |
| 5,026,099 A | 6/1991 | Hendrix | |

(Continued)

*Primary Examiner* — David E Bochna
(74) *Attorney, Agent, or Firm* — Renner, Otto, Boisselle & Sklar, LLP

(57) ABSTRACT

A threaded coupling wherein external threads of the male body of the male coupling half are in mating engagement with internal threads of the female sleeve of the female coupling half. The female sleeve includes an interior hook and the male body includes a locking lever receptacle recessed therein as well as first and second slots for receiving first and second pins of the locking lever. The locking lever pivotally resides in the receptacle and interlocks with the hook of the female sleeve uniting the male and female. A tensioning O-ring secures the locking lever to the male body. A locking sleeve extends circumferentially about the male body and prohibits the release of the hook of the female sleeve from a recess in the locking lever unless a window is aligned with the locking lever. A process for locking the threaded coupling is also disclosed.

16 Claims, 20 Drawing Sheets

(56) References Cited

U.S. PATENT DOCUMENTS

| | | |
|---|---|---|
| 5,099,883 A | 3/1992 | Maiville |
| 5,131,689 A | 7/1992 | Bates |
| 5,139,289 A | 8/1992 | Koss |
| 5,195,785 A | 3/1993 | Jellison |
| 5,199,844 A | 4/1993 | Gilmore, Jr. et al. |
| 5,209,529 A | 5/1993 | Yan et al. |
| 5,215,336 A | 6/1993 | Worthing |
| 5,251,939 A | 10/1993 | Jordan |
| 5,251,940 A | 10/1993 | DeMoss et al. |
| 5,301,985 A | 4/1994 | Terzini |
| 5,362,110 A | 11/1994 | Bynum |
| 5,401,062 A | 3/1995 | Vowles |
| 5,568,946 A | 10/1996 | Jackowski |
| 5,628,531 A | 5/1997 | Rosenberg et al. |
| 5,782,502 A | 7/1998 | Lewis |
| 5,797,626 A | 8/1998 | Ruggero |
| 5,823,702 A | 10/1998 | Bynum |
| 5,931,508 A | 8/1999 | Spriegel |
| 5,944,362 A | 8/1999 | Harle |
| 5,971,442 A | 10/1999 | Kozinski et al. |
| 5,988,693 A | 11/1999 | Street |
| 5,988,694 A | 11/1999 | Brushaber |
| 6,053,540 A | 4/2000 | Meyer |
| 6,070,913 A | 6/2000 | Hopper et al. |
| 6,108,865 A | 8/2000 | Veser et al. |
| 6,206,431 B1 | 3/2001 | Street |
| 6,206,433 B1 | 3/2001 | Bloomer |
| 6,224,113 B1 | 5/2001 | Chien |
| 6,290,264 B1 | 9/2001 | Inoue |
| 6,318,762 B2 | 11/2001 | Inoue |
| 6,364,369 B2 | 4/2002 | Bailey |
| 6,382,680 B1 | 5/2002 | Horimoto |
| 6,447,016 B2 | 9/2002 | Collier |
| 6,511,098 B1 | 1/2003 | Luterstein |
| 6,543,812 B1 | 4/2003 | Chang |
| 6,588,790 B2 | 7/2003 | Hall |
| 6,629,707 B1 | 10/2003 | Yamaguchi |
| 6,669,237 B1 | 12/2003 | Burch et al. |
| 6,863,314 B2 | 3/2005 | Guest |
| 6,913,294 B2 | 7/2005 | Treverton et al. |
| 6,926,311 B2 | 8/2005 | Chang et al. |
| 7,159,826 B1 | 1/2007 | Bruce |
| 7,240,930 B2 | 7/2007 | Stravitz |
| 7,243,953 B2 | 7/2007 | Nakamura et al. |
| 7,316,428 B2 | 1/2008 | Takayanagi et al. |
| 7,377,553 B2 | 5/2008 | Takayanagi |
| 7,390,008 B1 | 6/2008 | Hall |
| 7,523,963 B2 | 4/2009 | Draper et al. |
| 7,604,263 B2 | 10/2009 | Mori et al. |
| 7,722,086 B2 | 5/2010 | Ishiki et al. |
| 7,754,953 B2 | 7/2010 | Takegawa |

\* cited by examiner

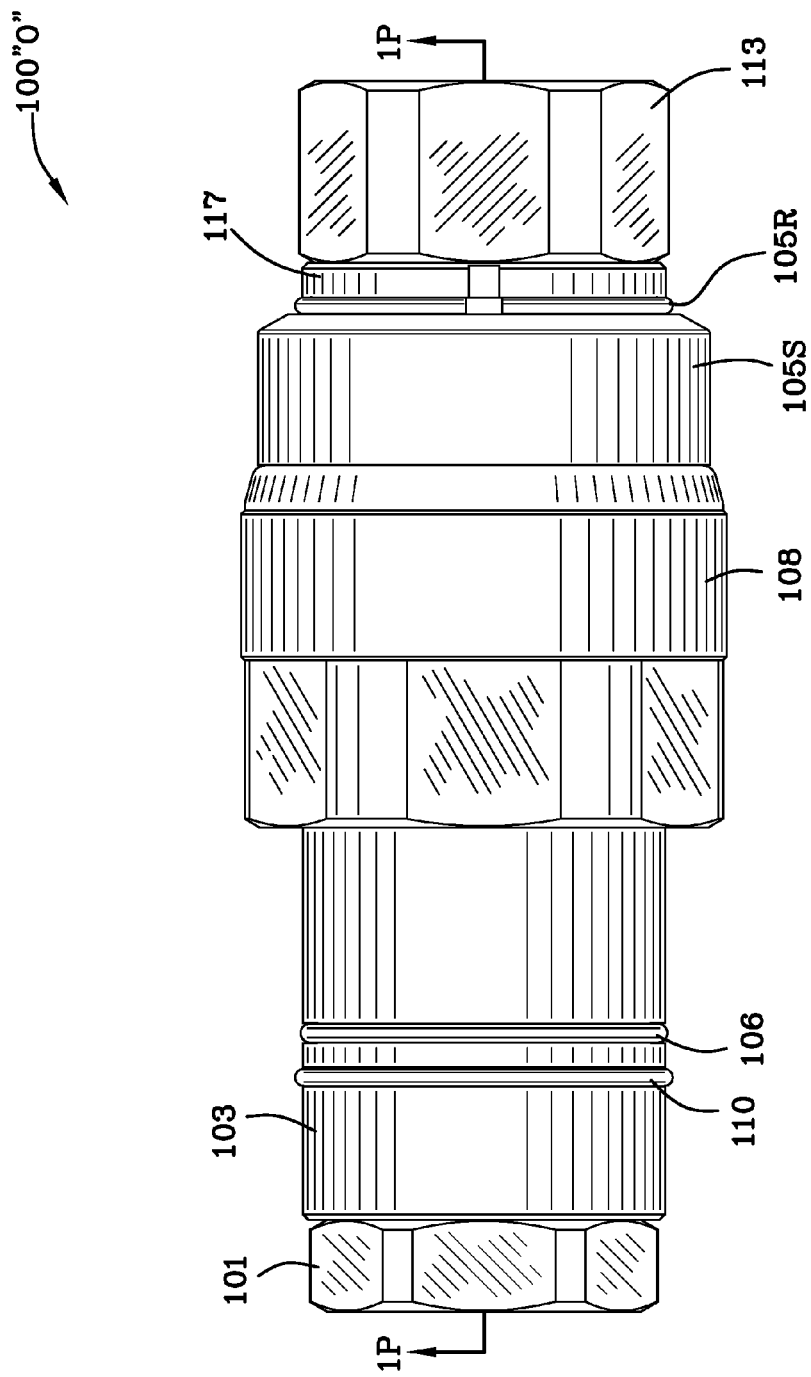
FIG. 1"O"

COUPLING LOCK MECHANISM

FIELD OF THE INVENTION

The invention is in the field of threaded couplings having locking means to prevent unthreading due to vibration or other unwanted disconnection.

BACKGROUND OF THE INVENTION

Disconnection of threaded couplings is a known problem. Unwanted disconnection of threaded couplings can cause injury to personnel and damage to equipment which depends on the proper connection of the threaded coupling.

SUMMARY OF THE INVENTION

A threaded coupling includes a generally cylindrically shaped male coupling half and a generally cylindrically shaped female coupling half. The male coupling half includes a male body and the male body includes an exterior, and the exterior of the male body includes external threads thereon. The female coupling half includes a female body and a female sleeve. The female sleeve and the male body are threaded together. The female sleeve further includes an interior and the interior of the female sleeve includes internal threads. The external threads of the male body are in mating engagement with the internal threads of the female sleeve. The female sleeve further includes an end portion and the end portion of the female sleeve includes an interior hook formed therein. The male body includes a locking lever receptacle recessed in the exterior of the male body, and the locking lever receptacle of the male body further includes first and second slots therein. A locking lever includes coaxial first and second pivot pins, a latching end and a sloped end. The latching end of the latching lever includes a recess and a latching surface. The first and second pivot pins of the locking lever reside in the first and second slots of the locking lever receptacle of the male body. The locking lever pivots about the pivot pins and the locking lever includes an O-ring slot therein. All of the components are preferably made of metal. However, it is specifically contemplated that other materials such as plastics may be used for some of the components.

The male body includes an O-ring slot therein which extends circumferentially around the generally cylindrically shaped male body and is aligned with the O-ring slot in the locking lever. A tensioning O-ring extends circumferentially in the O-ring slot in the male body and in the O-ring slot in the locking lever biasing the latching end of the locking lever to a raised position for engagement with the interior hook formed on the end of the female sleeve. The tensioning O-ring secures the locking lever in the receptacle and prevents it from being extracted therefrom. The latched end of the locking lever is raised for engagement with the interior hook of the female sleeve prior to engagement. During engagement, the hook of the end of the female sleeve engages the recess of the latching end of the locking lever and the latching end of the locking lever pivots about the first and second pivot pins to a position proximate the receptacle of the male body.

Once the hook and the recess of the locking lever are fully engaged, the latching end of the locking lever is returned to the raised position under the force of the tensioning O-ring. When the latching end of the locking lever is forced downwardly under the force of the interior or inner hook of the female, the tensioning O-ring is under additional tension. The tensioning O-ring is under some tension even when the locking lever is not being rotated.

A locking sleeve is employed to ensure that the inner hook of the female sleeve remains engaged with the locking lever which is inserted into the male body. When the locking lever is inserted in the receptacle of the male body, the pins, the tensioning O-ring and the locking sleeve secure the locking lever in place against the force of the female sleeve in the event that someone attempts to unthread the female sleeve from the male body inappropriately improperly or that vibration attempts to loosen the coupling halves and unthread them.

The locking sleeve is generally cylindrically shaped and engages the exterior of the male body and extends circumferentially thereabout. The locking sleeve resides in proximity with the female sleeve when the male and female halves are hilly coupled, and, the locking sleeve prevents the coupling halves from being unthreaded. The locking sleeve includes an appropriately sized access window or port therethrough which enables latching and unlatching the interior hook of the female sleeve from the male body. The appropriately sized access window or port when aligned with the locking lever permits the locking lever to rotate to accomplish either the latching or unlatching of the hook and the recess of the locking lever and, hence, coupling or uncoupling of the female sleeve and the male body.

The locking lever includes a sloped end and the interior of the locking sleeve includes a reciprocally shaped sloped end which blocks rotation of the locking lever unless the access window or port is aligned with the locking lever. The locking sleeve may include a shaped which is not the reciprocal of the sloped end of the locking lever. Another shape may be used which obstructs the rotation of the locking lever. The locking sleeve is rotatable from an unlocked position to a locked position where it is not possible to lock or unlock the male body and the female sleeve. A second O-ring is interposed in compression between the locking sleeve and the male body. The second O-ring resides in compression in an O-ring groove of the locking sleeve. The second O-ring is in engagement with the exterior of the male coupling and grips the exterior inhibiting unwanted rotation of the sleeve with respect to the exterior of the male body thus preventing inadvertent alignment of the access window with the locking lever.

A process for locking a threaded coupling wherein the coupling includes: a male body having external threads and a female sleeve having internal threads; the male body includes an O-ring slot therein, a locking lever receptacle, and, a raised portion, and the raised portion includes first and second slots; the female coupling further includes an end portion, and, the end portion includes a hook; a locking lever, the locking lever includes a latching end having a recess therein, first and second pins, an O-ring slot and a sloped end. The process includes the steps of: inserting the locking lever into the receptacle of the male body and inserting the first and second pins of the locking lever into the first and second slots of the raised portion of the male member, the first and second pins of the locking lever permitting rotation of the lever about the pins; positioning an O-ring in the O-ring slot of the male body and in the O-ring slot of the locking lever securing the locking lever with respect to the male body, the O-ring permitting rotation of the locking lever about the pins with resistance to the rotation; and, progressively threading the female coupling having into internal threads onto the male body having external threads moving the hook longitudinally toward the locking lever; engaging the hook and the latching end of the locking lever, and as the progressive threading continues, the hook moving and forcing the locking lever to rotate the latching end thereof radially downwardly toward the male body;

extending the hook of the female sleeve longitudinally further until the hook proceeds into the recess of the locking lever or thereabout and the locking lever rotates the latching end thereof upwardly; and, interengaging the hook of the female sleeve and the recess of the locking member securing the male body and the female sleeve together; locking the interengaged hook of the female member and the recess of the latching end of the locking lever together using a locking sleeve; positioning the locking sleeve between the hook of the female sleeve and a snap ring affixed in the male body; inhibiting rotation of the locking sleeve against unwanted rotation of the locking sleeve by vibration by interposing a second O-ring between the male body and the sleeve such that force is required to rotate the locking sleeve with respect to the male portion.

The locking lever includes a bottom surface and the lever receptacle includes a flat surface. The bottom surface of the locking lever is spaced apart from the flat surface of the receptacle thus enabling the locking lever to pivot without engagement with the flat surface of the receptacle. The locking lever pivots about the coaxial pins during engagement of the lever with the interior hook of the female sleeve.

BRIEF DESCRIPTION OF THE DRAWINGS

FIG. 1O is a top schematic view of the coupling fully threaded together locking sleeve rotated such that the access window is not visible.

Figure 1:
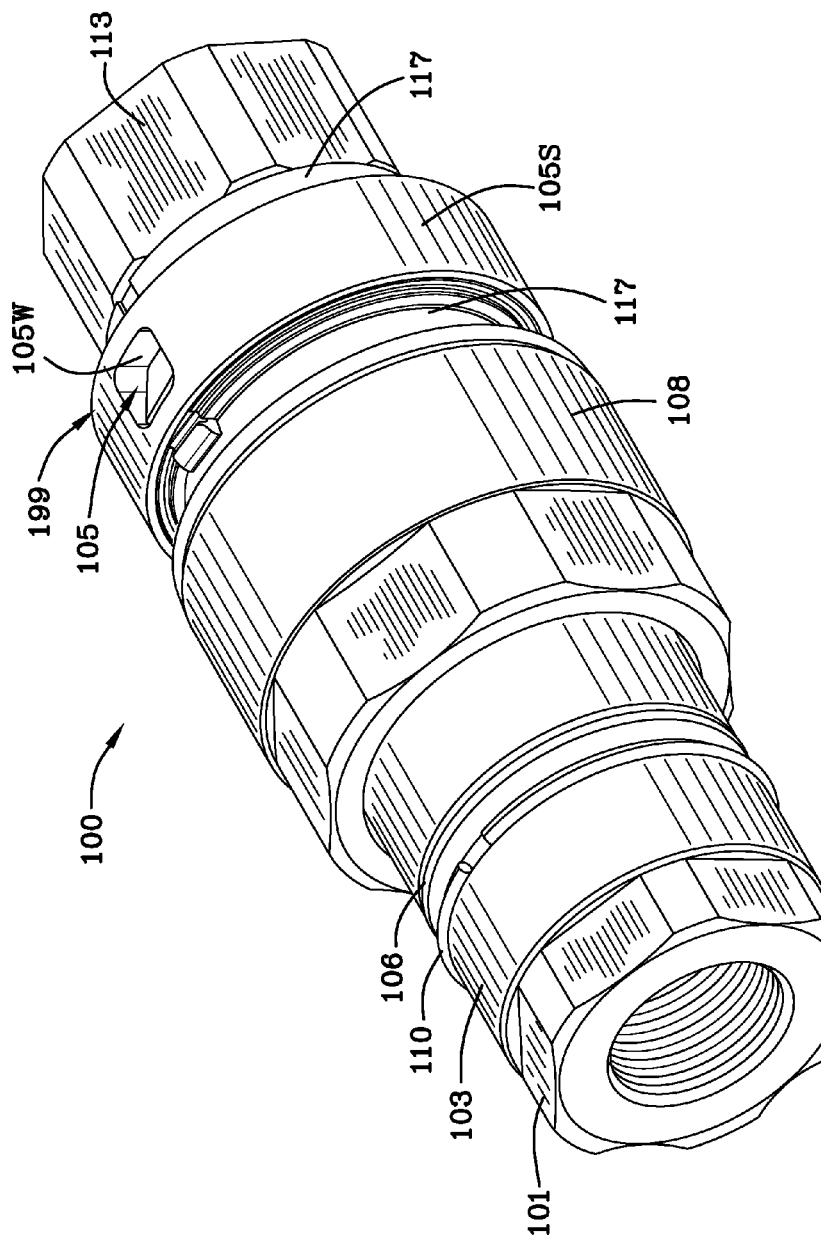
FIG. 1 is a perspective schematic view of coupling partially threaded together.

The invention will be better understood when reference is made to the description, the reference numerals and claims set forth below.

DESCRIPTION OF THE INVENTION

FIG. 1 is a perspective view 100 of the substantially cylindrically shaped metal coupling partially threaded together. Female sleeve 108 is illustrated in partial engagement with the male body 117. Arrow 105 points/indicates the locking lever. Locking sleeve 105S surrounds male body 117. An access window or port is formed by a wall 105W in the locking sleeve 105S. Access window 199 is large enough to enable operation of locking lever 105 as explained in detail herein.

Figure 1A:
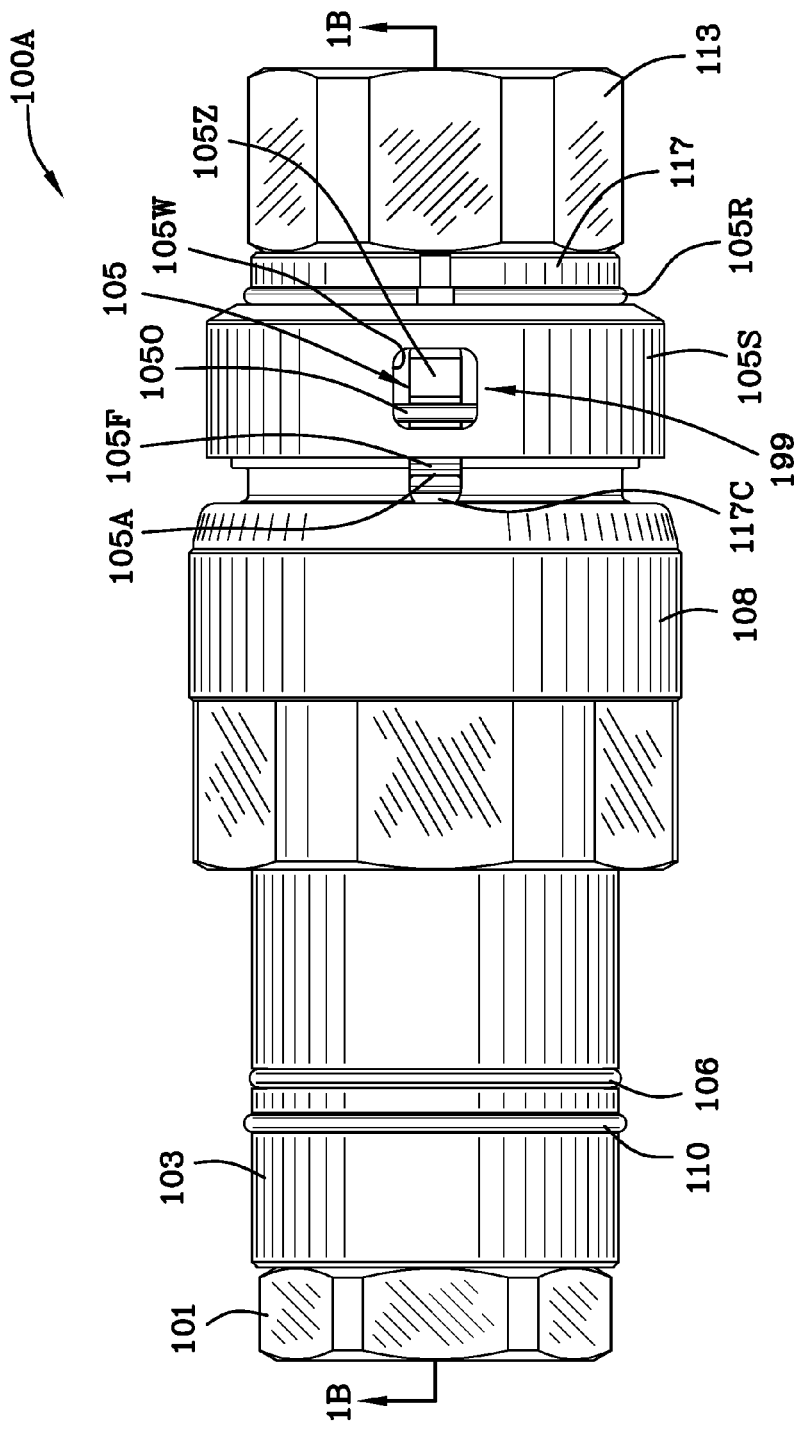
FIG. 1A is a top schematic view of the coupling partially threaded together.
Figure 1B:
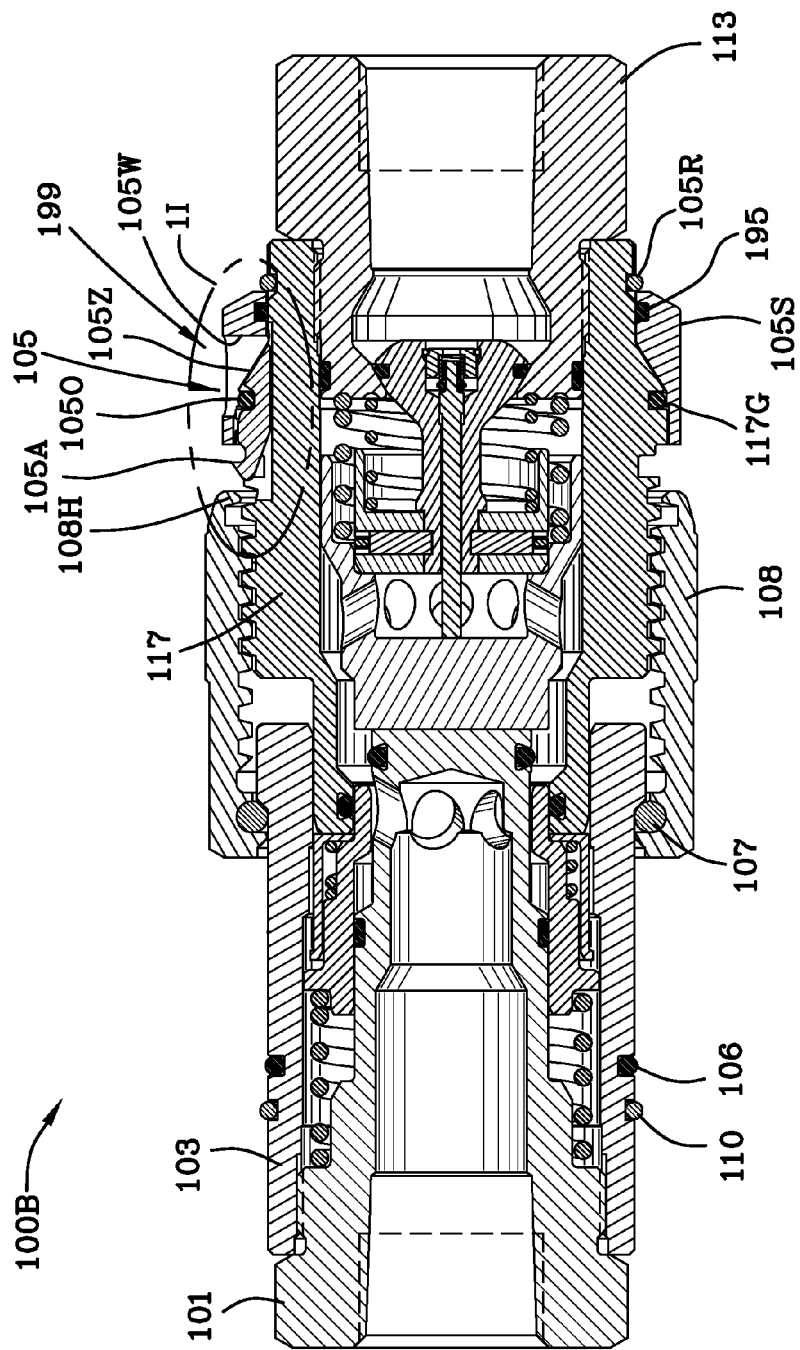
FIG. 1B is a cross-sectional schematic view of the coupling partially threaded together taken along the lines 1B-1B.
Figure 1C:
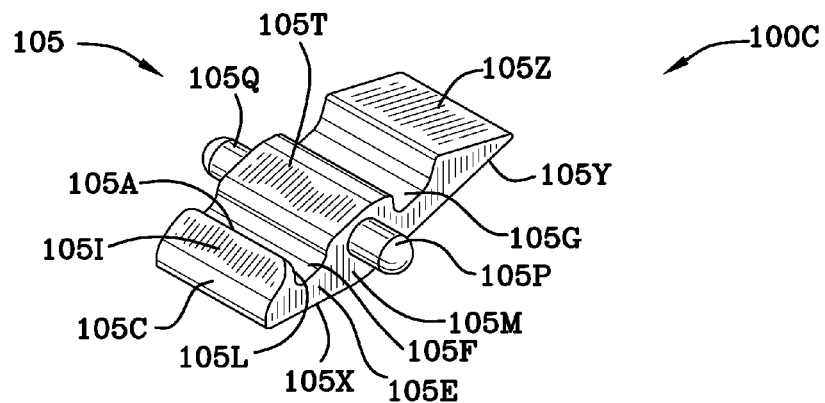
FIG. 1C is a perspective schematic view of the locking lever.
Figure 1D:
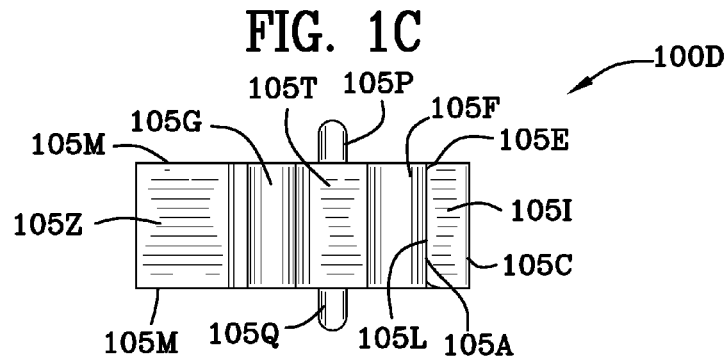
FIG. 1D is a top schematic view of the locking lever.
Figure 1E:
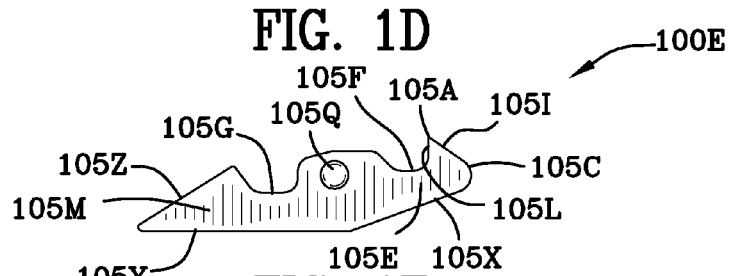
FIG. 1E is a left side schematic view of the locking lever.
Figure 1F:
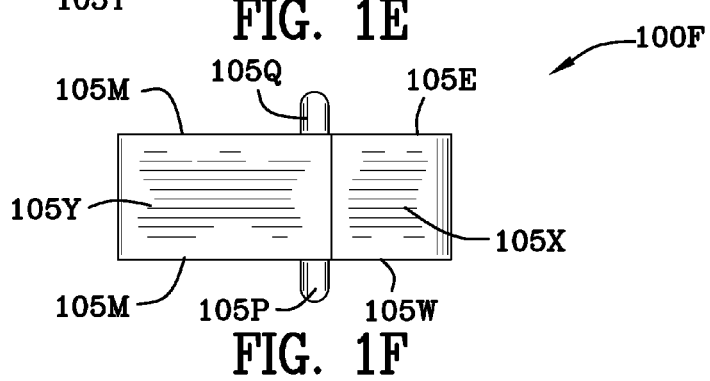
FIG. 1F is a bottom side schematic view of the locking lever.
Figure 1H:
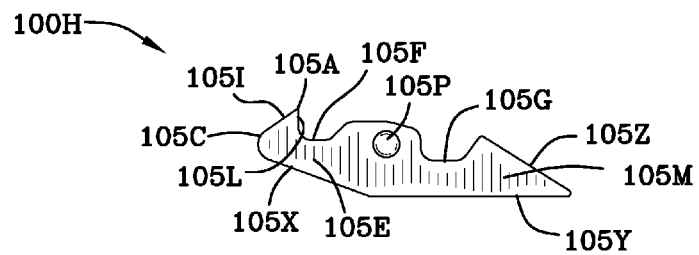
FIG. 1H is a right side schematic view of the locking lever.
Figure 1G:
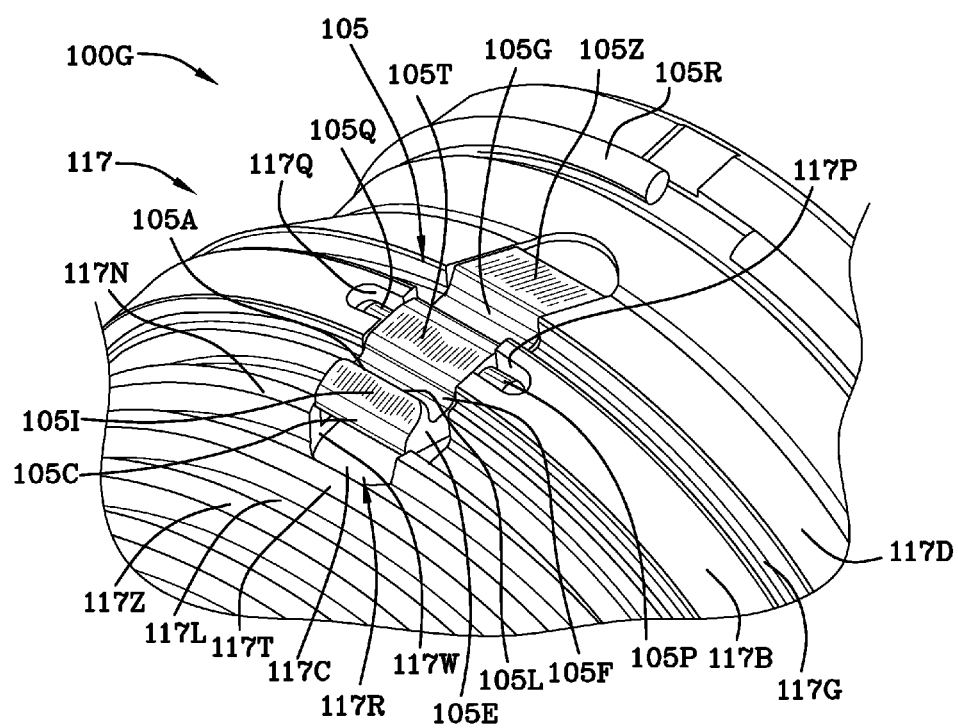
FIG. 1G is a perspective schematic view of the male body having external threads and a receptacle for the locking lever and the locking lever positioned in the receptacle.

Referring to FIG. 1A, male adaptor 113 and snap ring 105R are illustrated. Snap ring 105R secures locking sleeve 105S on the male body. See FIG. 1L. FIG. 1L is a top view 100L of the coupling fully threaded together illustrating the locking sleeve 105S and access window 199 in the locking sleeve 105S.

Still referring to FIG. 1, the female body 103 is threaded to the female adaptor 101. Reference numeral 106 is a seal and reference numeral 110 is a snap ring which limits how far the female sleeve 108 can be unthreaded. Reference numeral 106 is a seal on the outside of the female body 103.

FIG. 1A is a top view 100A of the coupling partially threaded together. Flat bottom 117C of the locking lever receptacle can be seen in FIG. 1A along with the locking lever 105. Recess 105 F, apex 105A, tensioning O-ring 105O, and the sloped end 105Z are illustrated in FIG. 1A. Wall 105W forms the access window or port 199 which enables the male coupling half and the female coupling half to couple and which enables female sleeve 108 to latch to male body 117. More specifically, access window 199 enables the hook of the female sleeve to engage with recess 105F, for example, locking the female sleeve 108 to the male body 117. FIG. 1B is a cross-sectional view 100B of the coupling partially threaded together taken along the lines 1A-1A with female sleeve 108 and hook 108H approaching locking lever 105. Access window 199 is illustrated in cross section and sleeve 105S is illustrated in cross section at the bottom of the view as having a shape, in cross section, which approximates very closely the reciprocal of the shape of the locking lever positioned in locking lever receptacle 117R. See FIGS. 1I, 1J, and 3 for a view of locking lever receptacle 117R. Second O-ring 195 is illustrated in compression between locking sleeve 105S and male body 117. Snap ring 105R blocks locking sleeve 105S from extraction off of male body 117. Circumferential O-ring groove 117G houses O-ring 105O. O-ring 105O retains locking lever 105 from extraction and also serves to position apex 105A of the latching end in a raised position for engagement with hook 108H. FIG. 1B illustrates detents or balls 107 which facilitate rotation of female sleeve 108 and also serve as bearing for pulling female body 103 therewith.

Figure 1I:
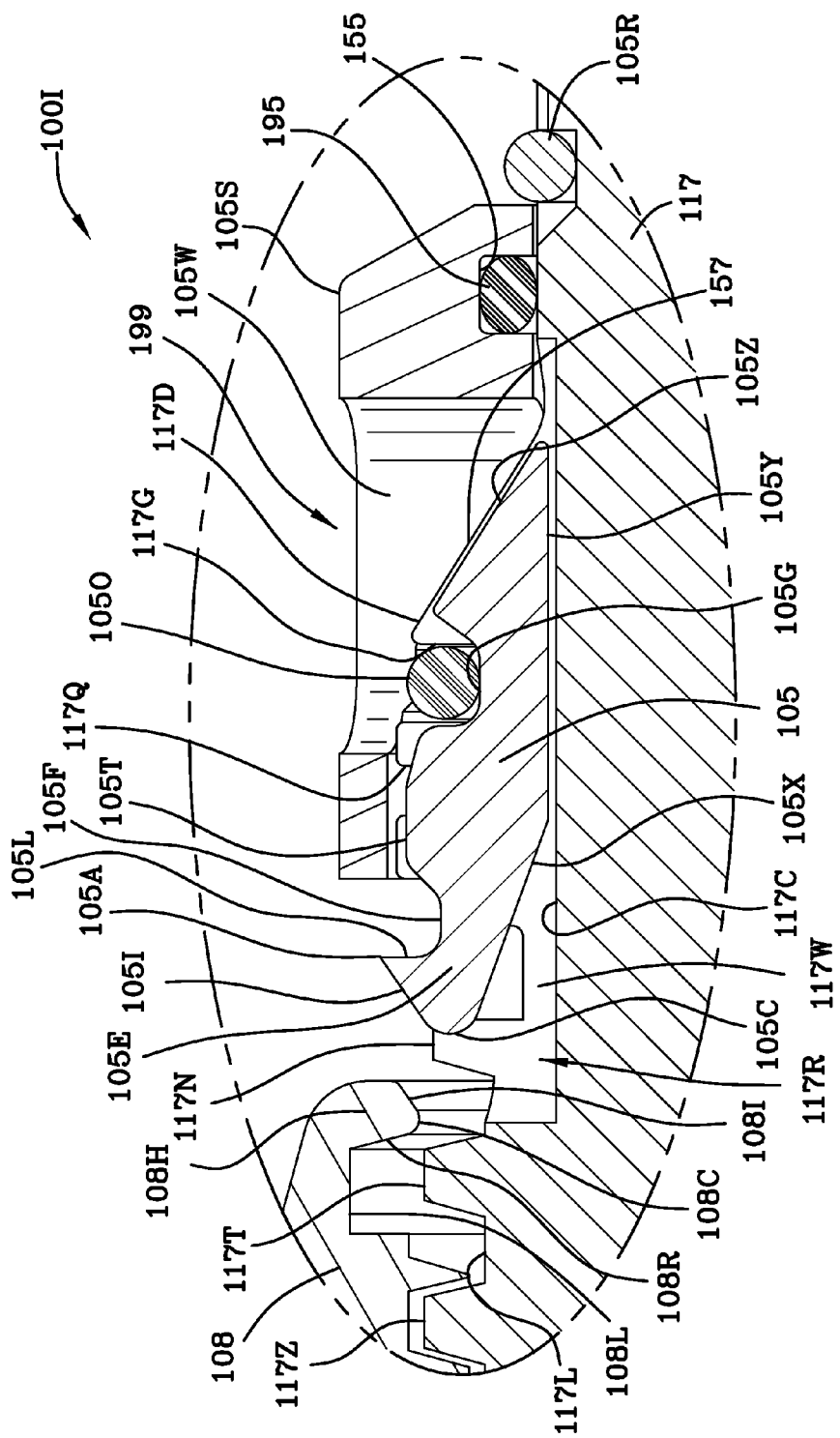
FIG. 1I is an enlargement of a portion of FIG. 1B.

FIG. 1I is an enlargement of a portion 100I of FIG. 1B where considerable more detail is visible. Referring to female sleeve 108, hook portion 108H, inclined portion 108I, radially inwardly surface 108R, curved tip 108C and recess 108I, are illustrated FIG. 1I. Inclined portion 108I of the hook is at approximately the same angle as inclined portion 105I of the locking lever and this facilitates pushing the hook 108H into engagement with and over the inclined surface 108I as the female sleeve interlocks with the locking lever. See FIGS. 1J and 1K.

Figure 1J:
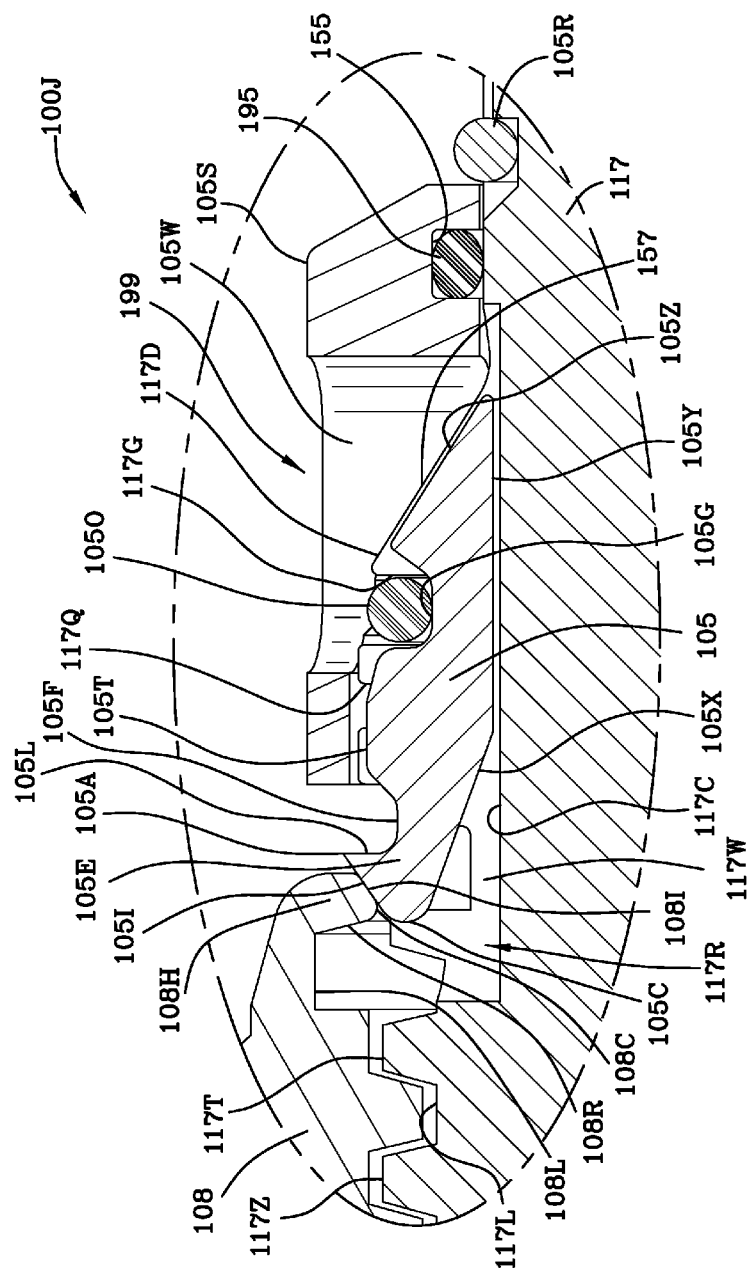
FIG. 1J is a cross-sectional schematic view of the interior hook of the female sleeve engaging the locking lever.
Figure 1K:
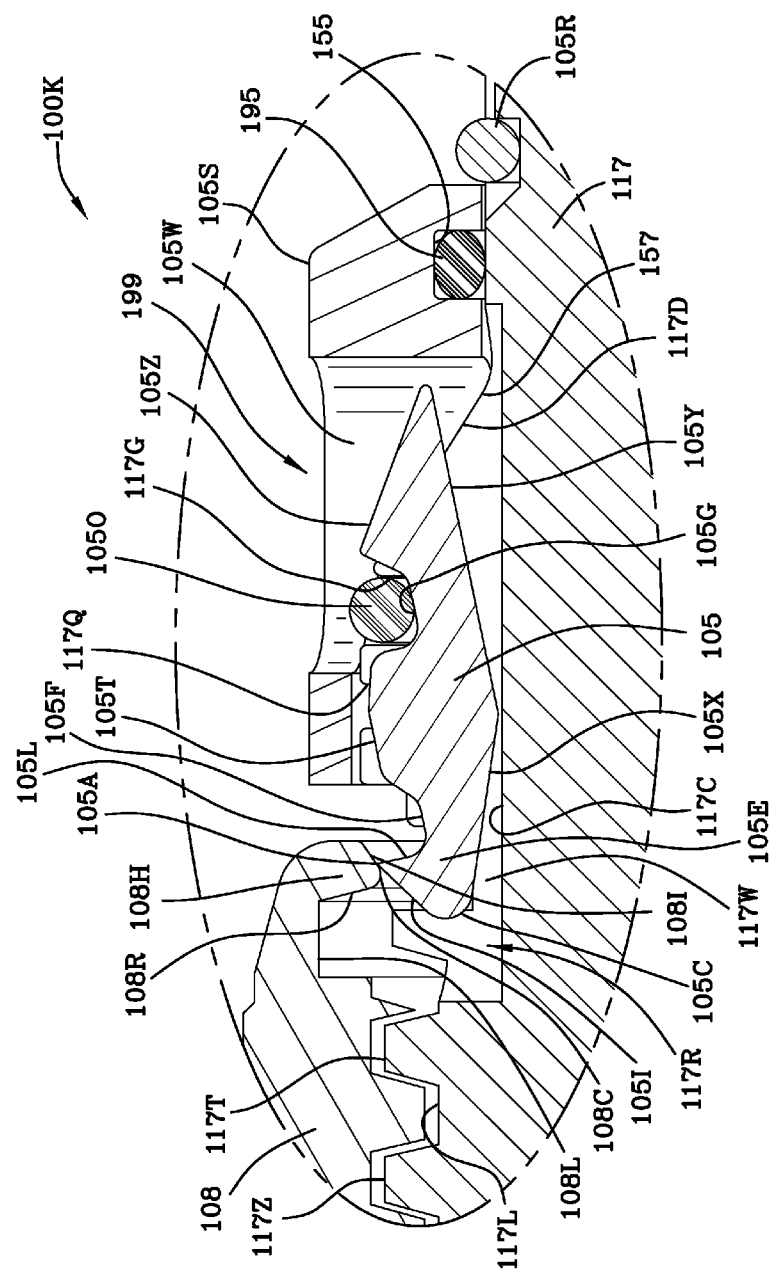
FIG. 1K is a cross-sectional schematic view of the interior hook of the female sleeve engaging the apex of the locking lever.
Figure 1L:
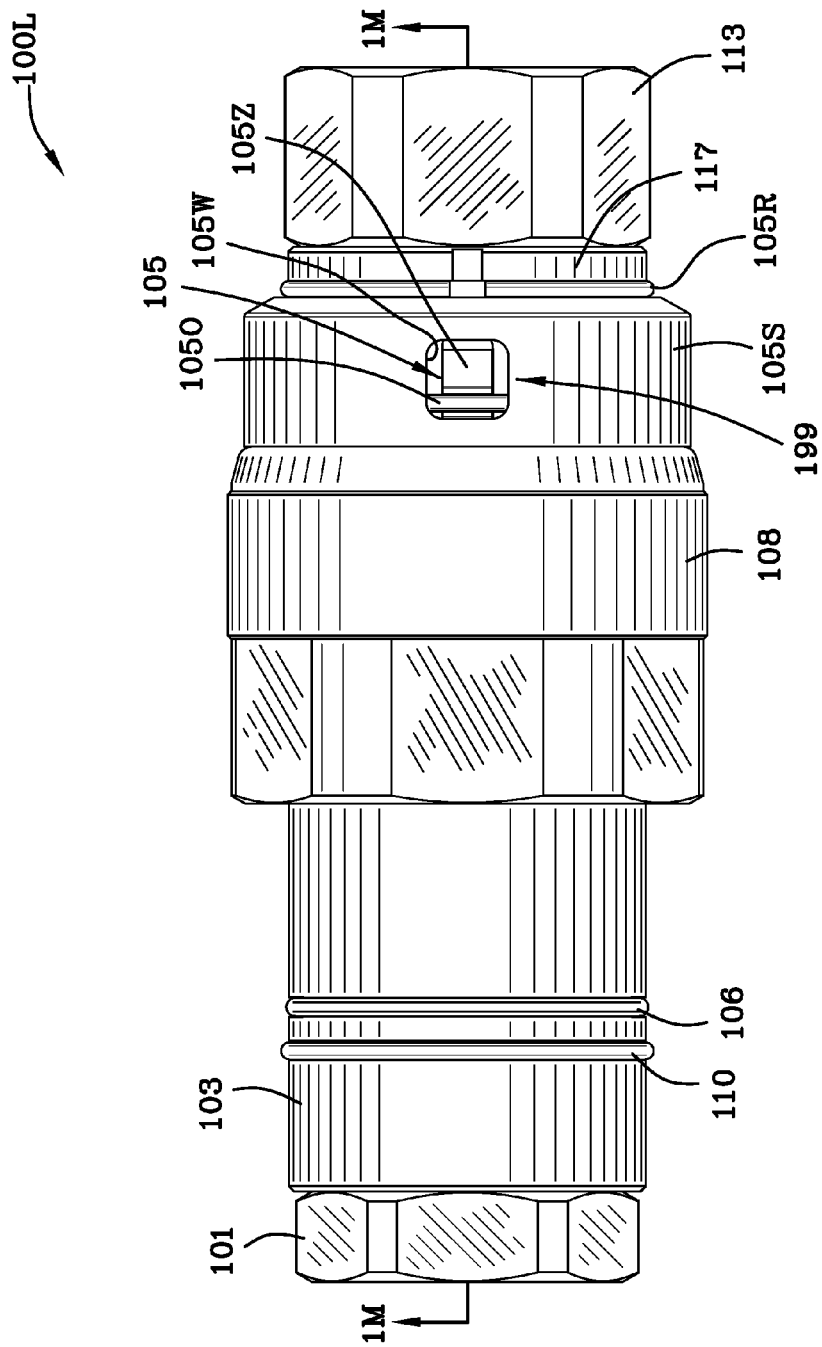
FIG. 1L is a top schematic view of the coupling fully threaded together illustrating the locking sleeve and access window in the locking sleeve.

FIG. 1J is a cross-sectional view 100J of the interior hook 108H of the female sleeve 108 engaging the locking lever 105, specifically, inclined surface 108I of hook 108H is illustrated in sliding engagement with inclined surface 105I but has not progressed longitudinally far enough rightwardly to cause rotation of the latching end 105E of locking lever 105 downwardly. FIG. 1K is a cross-sectional view 100K of the interior hook 108H of the female sleeve 108 engaging the apex 105A of the locking lever 105 causing rotation of the latching end 105E downwardly toward the flat bottom 117C of receptacle 117R. As apex 105A on the latching end 105E is pushed downwardly rotating the sloped end 105Z upwardly into access window 199, neither bottom surface 105X on the latching end 105E of the locking lever 105 nor bottom surface 105Y on the sloped end 105Z of the locking lever 105 engage the flat surface 117C of the locking lever receptacle 117R of the male body 117. Before engagement of the female sleeve 108 with the locking lever 105, the bottom surface 105Y of the locking lever is spaced apart from the flat surface 117C of the locking lever receptacle 117R of the male body 117 as illustrated in FIG. 1I.

Locking lever 105 includes a bottom surface and the bottom surface includes a latching end portion 105X and a sloped end portion 105Y. The latching end portion bottom surface 105X inclined with respect to the locking lever receptacle 117R in the male body when the tensioning O-ring 105O resides in the O-ring slot 105G of the locking lever and in the O-ring slot 117G of the male body 117. Under these conditions the sloped end portion of the bottom surface 105Y is parallel to and in proximity to the locking lever receptacle. See, for example FIG. 1I.

Figure 1M:
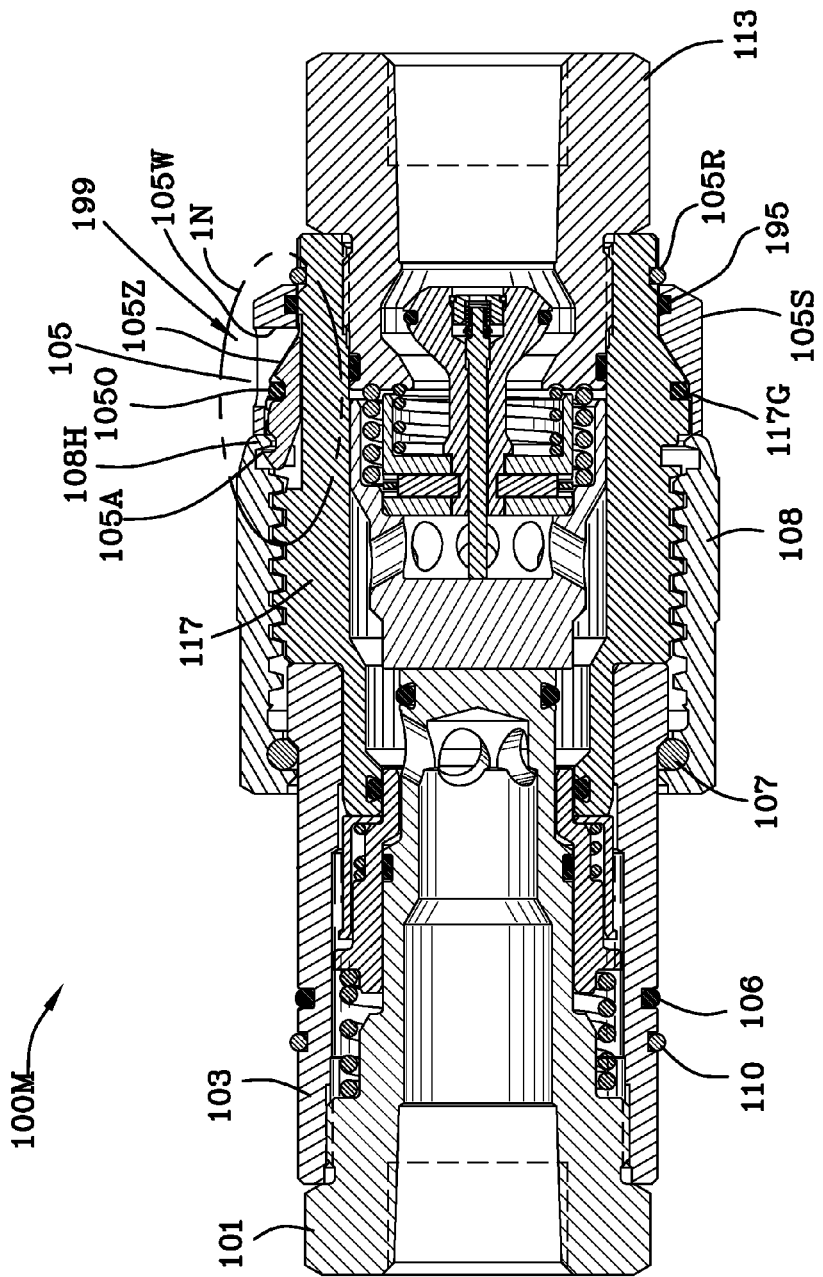
FIG. 1M is a cross-section schematic view of the coupling fully threaded together taken along the lines 1M-1M of FIG. 1L.
Figure 1N:
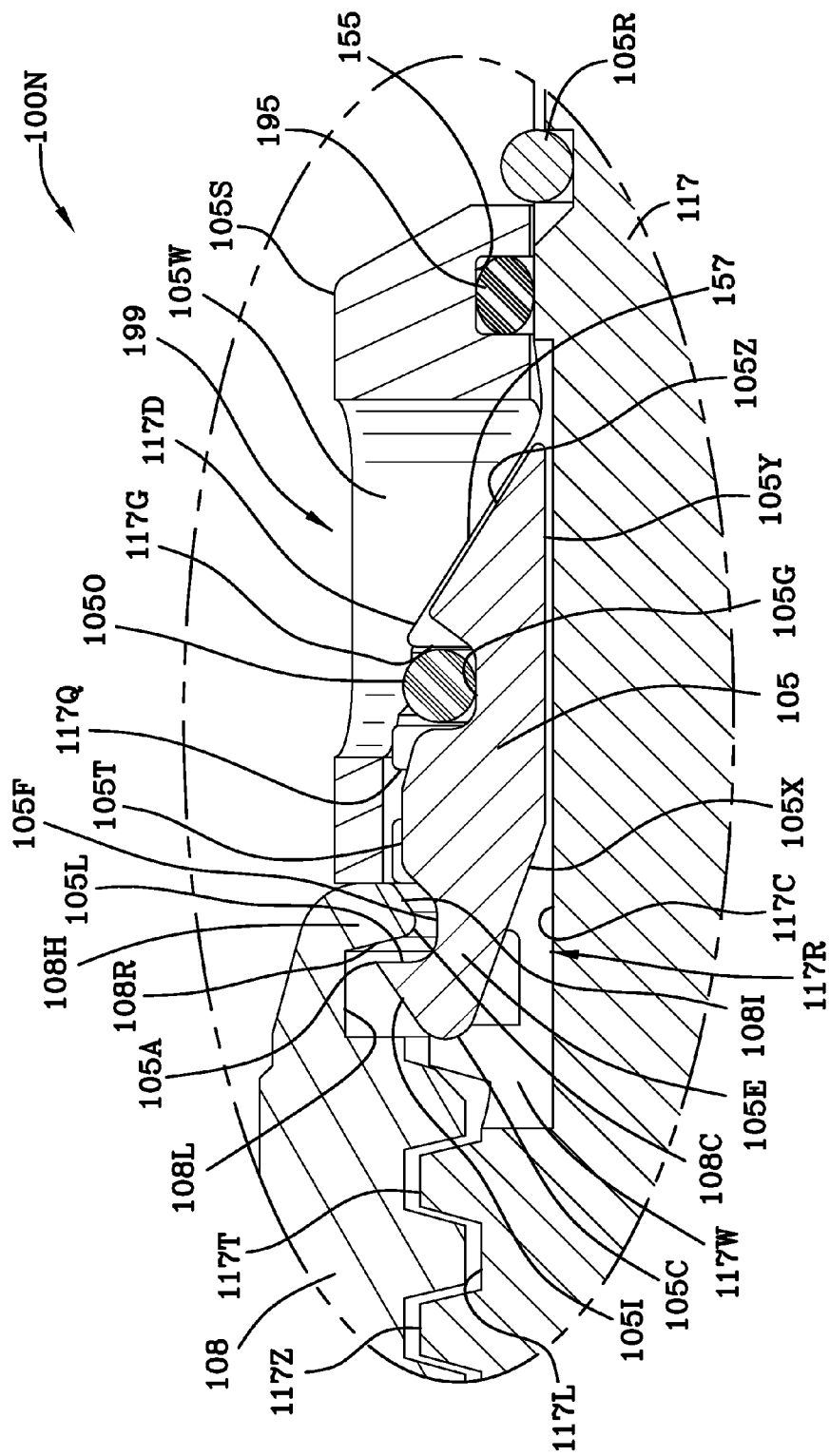
FIG. 1N is an enlargement of a portion of FIG. 1M.
Figure 1P:
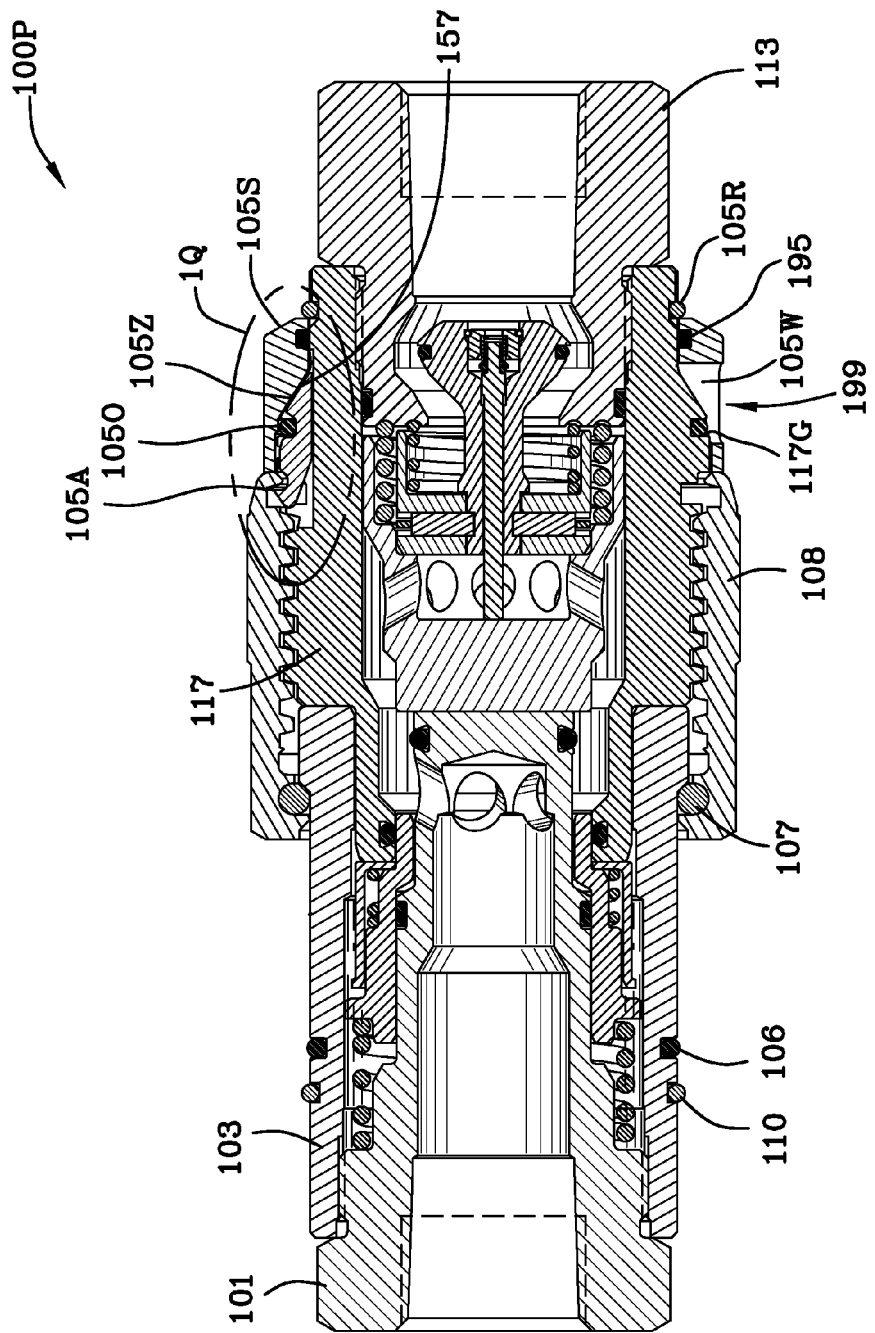
FIG. 1P is a cross-sectional schematic view of the coupling taken along the lines 1P-1P of FIG. 1O.
Figure 1Q:
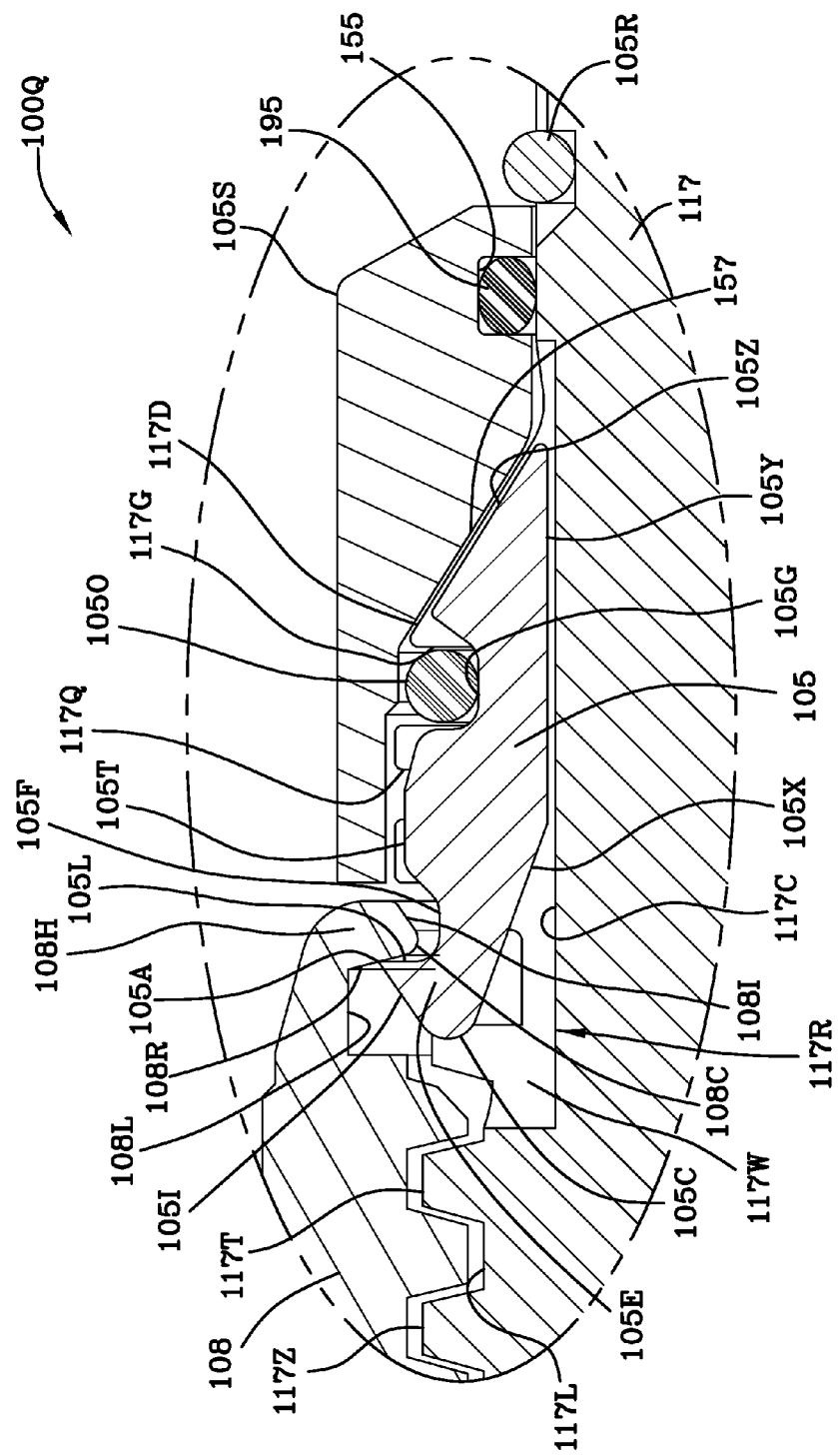
FIG. 1Q is an enlarged portion of FIG. 1P.
Figure 3:
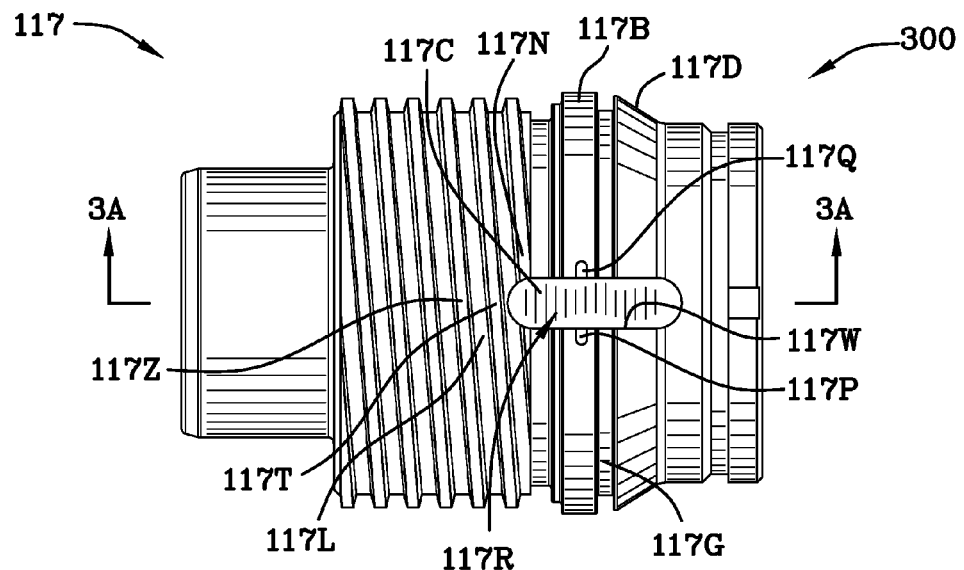
FIG. 3 illustrates a schematic top view of the male body.
Figure 3A:
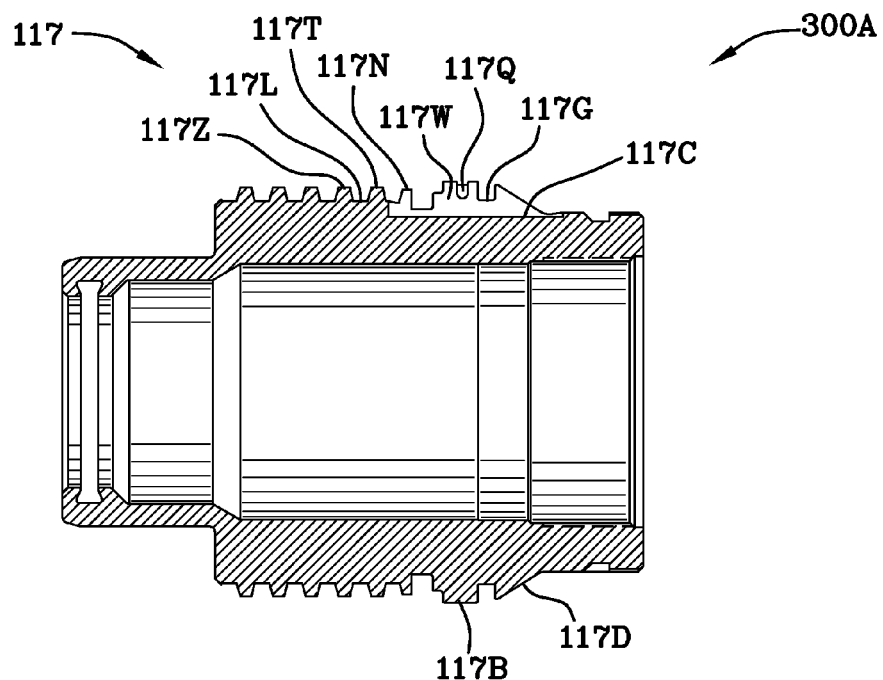
FIG. 3A illustrates a cross-section schematic view of the male body taken along the lines 3A-3A of FIG. 3.

Referring to FIGS. 1C, 1D, 1E, and 1F, different views of the locking lever are illustrated. FIG. 1C is a perspective view 100C of the locking lever 105 illustrating coaxial pins 105Q, 105P which reside in slots 117Q, 117P of the male body 117 as illustrated in FIGS. 1G and 3. FIG. 3 illustrates a top view 300 of the male body 117 and FIG. 3A illustrates a cross-section view 300A of the male body 117 taken along the lines 3A-3A of FIG. 3. FIG. 3 illustrates locking lever receptacle 117R as having a rectangular section closed by two semicircles, one at each end of the rectangle. Reference numeral 117W represents the walls of the receptacle 117R. FIG. 3A illustrates a portion the wall 117W. First and second pin slots 117Q, 117P are illustrated in FIGS. 3 and 3A and the slots reside in a relatively wide band 117B which extends circumferentially around the male body 117. Slot 117Q, 117P are vertically spaced apart from flat surface 117C of the receptacle 117R to ensure that locking lever 105 pivots on an axis sufficiently high so that the bottom surfaces 105X, 105Y do not engage the flat surface 117C of the receptacle 117R in male body 117. FIGS. 3, 3A, 1I, 1J, 1K illustrate ACME threads 117Z, 117T and 117N well. In FIGS. 1I, 1J, and 1K, threads 117Z, 117T and 117N are illustrated with corresponding ACME threads of the female sleeve shown interengaging the aforementioned threads of the male body 117. Groove 117L between 117T and 11Z is also illustrated. Any type of threads may be used without departing from the spirit and the scope of the invention. Further, the threaded interconnection is illustrated with gaps between engaging threads. These gaps are shown to illustrate the interengagement of the threads and in actual practice there will be metal to metal engagement of the threads. Similarly in FIG. 1N, which illustrates hook 108H not engaging the latching surface 105L of the latching end occurs in certain circumstances due to the stack up of tolerances and the state of the threading process, and, further it will be understood that these illustrations are diagrammatic and schematic. Actual metal to metal contact between hook 108H and the latching surface 105L occurs due to the stack up of tolerances and other factors such as vibration of the coupling and is shown, for instance, in FIG. 1Q. For instance, reference is made to FIG. 1O. FIG. 1O is a top schematic view 100O of the coupling fully threaded together with the locking sleeve 105S rotated such that the access window is not visible. FIG. 1P is a cross-sectional schematic view 100P of the coupling taken along the lines 1P-1P of FIG. 1O. FIG. 1Q is an enlarged portion 100Q of FIG. 1P. FIG. 1Q is similar to FIG. 1N except that the female sleeve 108 and hook are illustrated as engaging the apex 105A and surface 105L of the locking lever 105.

Referring again to FIG. 1C, the flat top 105T of the locking lever 105 is illustrated between the tensioning O-ring groove 105G and the recess 105F. The latching end 105E includes a rounded portion 105C of the inclined surface 105I. Inclined surface 105I terminates in apex 105A. Latching surface 105L drops sharply/down to recess 105F. Sloped end 105Z matches the profile of the slope 117D of the male body as illustrated in FIGS. 1G, 3 and 3A. Planar bottom surfaces 105X, 105Y intersect each other at a line of intersection as illustrated in FIG. 1F. FIG. 1F is a bottom side view 100F of the locking lever, FIG. 1D is a top view 100D of the locking lever, and FIG. 1E is a left side view 100E of the locking lever. FIG. 1H is a right side view 100H of the locking lever. Reference numeral 105M denotes the side walls of the locking lever.

First and second pins 105Q, 105P are coaxial with respect to one another and, hence, the coaxial pins share an axis. There is a radius from the axis of the coaxial pins to the line of intersection of the planes formed by bottom surface 105X, 105Y. The radius is smaller than the distance from the axis of the pins to the locking lever receptacle when the first and second pins reside in the first and second slots of the receptacle.

Figure 4:
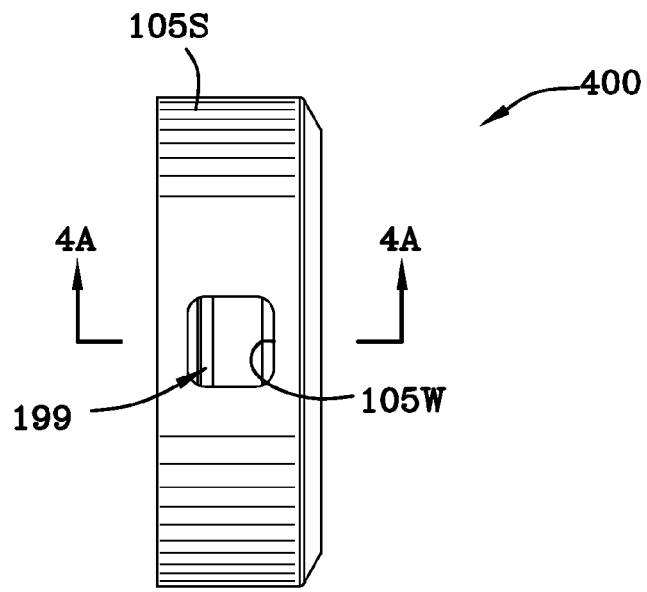
FIG. 4 is a top schematic view of the locking sleeve illustrating the access window.
Figure 4A:
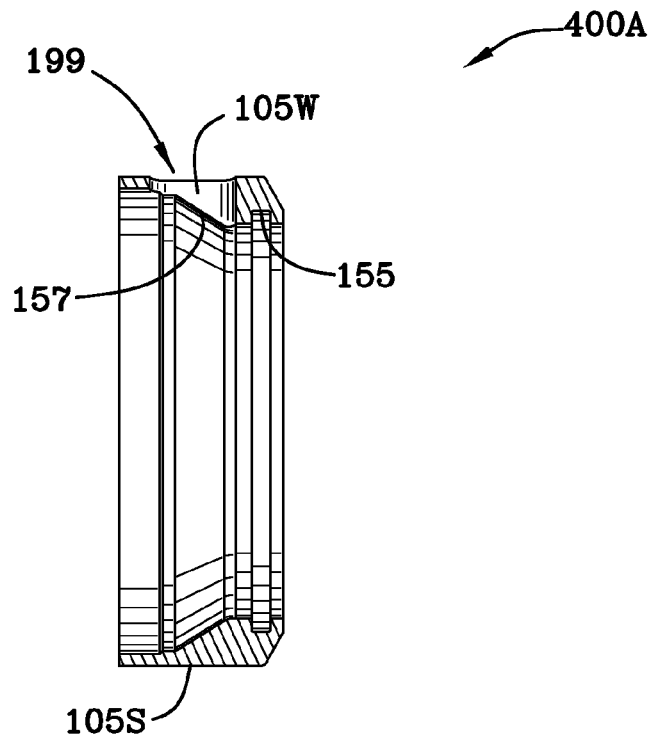
FIG. 4A is a cross-sectional schematic view taken along the lines 4A-4A of FIG. 4.

Referring again to FIGS. 1I, 3 and 3A, partial male thread 117N is illustrated in the background. Wall 17W of receptacle 117R is illustrated as well. Second O-ring 195 is illustrated in 1I as being in compression which causes friction when locking sleeve 105S is rotated with respect to the male body 117. Referring to FIG. 1I, sloped end 105Z of the locking lever is illustrated as having the same slope as the internal surface 157 of the locking sleeve. The internal surface of the locking sleeve may employ a different shape. FIG. 4 is a top view 400 of the locking sleeve 105S illustrating the access window 199 and FIG. 4A is a cross-sectional view 400A taken along the lines 4A-4A of FIG. 4 illustrating the O-ring groove 155 therein in which the second O-ring 195 resides in compression. Still referring to FIG. 1I, sloped surface 117D of the male body 117 is illustrated. FIG. 1I depicts that locking sleeve 105S has a reciprocally sloped surface to surface 117D of the male body and to sloped end 105Z of the locking lever.

Referring to FIG. 1I, the O-ring groove 105G is illustrated as being in alignment with O-ring groove 117G of the male body 117. FIG. 1G is a perspective view 100G of the male body 117 having external threads 117Z, 117T, 117N, a receptacle 117R for the locking lever 105, an O-ring groove 117G for an O-ring 105O (not shown in FIG. 1G) which biases the latching end portion 105E of the locking lever upwardly. FIG. 1G illustrates the sloped end 105Z residing at the same angle downward as circumferential surface 117D. FIG. 1G also illustrates the circumferentially extending relatively broad surface 117B. Tensioning O-ring 105O not shown in this view is necessary to secure the locking lever 105 seated in locking lever receptacle 117R. Snap ring 105R is illustrated in FIG. 1G and it is this snap-ring which retains the locking sleeve longitudinally. By longitudinal it is meant along the axis of the coupling or in the direction along which flow through the coupling would occur. Referring to FIG. 1G, tensioning O-ring groove 117G is illustrated in alignment with locking lever O-ring groove 105G.

FIGS. 1I, 1J, 1K illustrate the progression of continuous threading of the female sleeve 108 onto the threads of the male body. In FIG. 1I, no engagement of the female sleeve and the locking lever has taken place. In FIG. 1J the female sleeve has been threaded far enough onto the male body that the hook surface 108I of the female sleeve is engaging the inclined surface 105I of the latching end 105E of the lever but no rotation of the locking lever has taken place. In FIG. 1K, surface 108I is illustrated engaging the apex 105A of the latching end of the locking lever pushing the latching end downwardly and rotating the locking lever against the force of the tensioning O-ring 105O. O-ring 105O is illustrated in FIG. 1K as being under tension and slightly raised as O-ring groove 105G of the lever has been raised by the pivoting action.

FIG. 1L is a schematic top view 100L of the coupling fully threaded together with the locking sleeve 105S and access window 199 in the locking sleeve 105S. FIG. 1M is a cross-section schematic view 100M of the coupling fully threaded together taken along the lines 1M-1M of FIG. 1L. FIG. 1N is an enlargement 100N of a portion of FIG. 1M. In FIG. 1N the female sleeve 108 has fully threaded onto the locking lever 105. Female sleeve 108 resides in proximity with locking sleeve 105S and snap ring 105R restrains against longitudinal movement of locking sleeve 105S. Hook 108H resides in proximity with locking sleeve 105S. FIG. 1N illustrates that the tensioning O-ring 105O has returned to its normal position and latching end 105E has returned to its normal raised position. In FIG. 1N, the locking sleeve has not yet been rotated about the male body so as to put the coupling in a condition where it cannot be unthreaded.

FIG. 1O is a top schematic view 100O of the coupling fully threaded together with the locking sleeve 105S rotated such that the access window is not visible. FIG. 1P is a cross-sectional view 100P of the coupling taken along the lines 1P-1P of FIG. 1O. FIG. 1P illustrates that the access window has been rotated 180° from the position illustrated in FIGS. L, M and N. FIG. 1Q is an enlarged portion 100Q of FIG. 1P illustrating that the coupling is now in the safe position and cannot be unthreaded as the unthreading is blocked by the locking sleeve 105S and no rotation of the locking lever can occur and, therefore, the coupling is locked together until, and if, someone rotates the locking sleeve against the resistance provided by second O-ring 195 which is under compression. Further, FIG. 1Q illustrates hook 108H engaging lever 105. Hook 108H when fully locked may be in the position shown in FIG. 1N or the position shown in FIG. 1Q depending on the tolerance stack up of the components and also depending on vibration and the like which may move the female sleeve 108 to the position illustrated in FIG. 1Q. Additionally, hook 108H may reside anywhere between the positions shown in FIGS. 1N and 1Q.

Figure 1R:
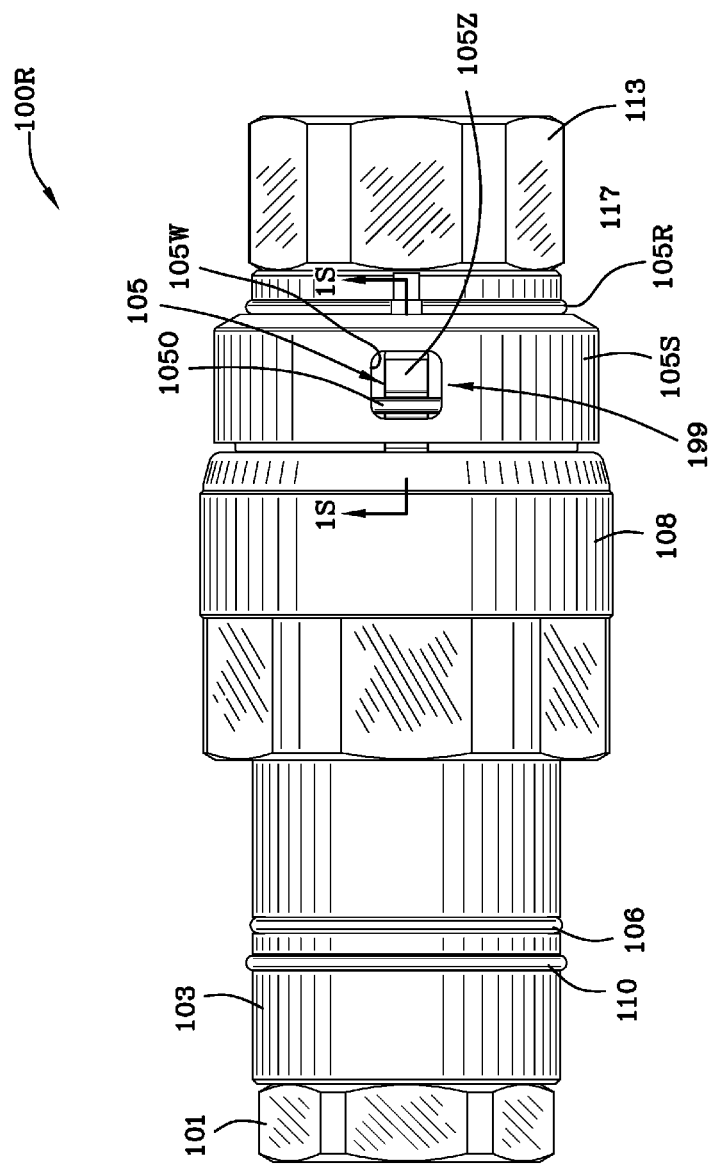
FIG. 1R is a top schematic view of the coupling in the early stage of being unthreaded.
Figure 1S:
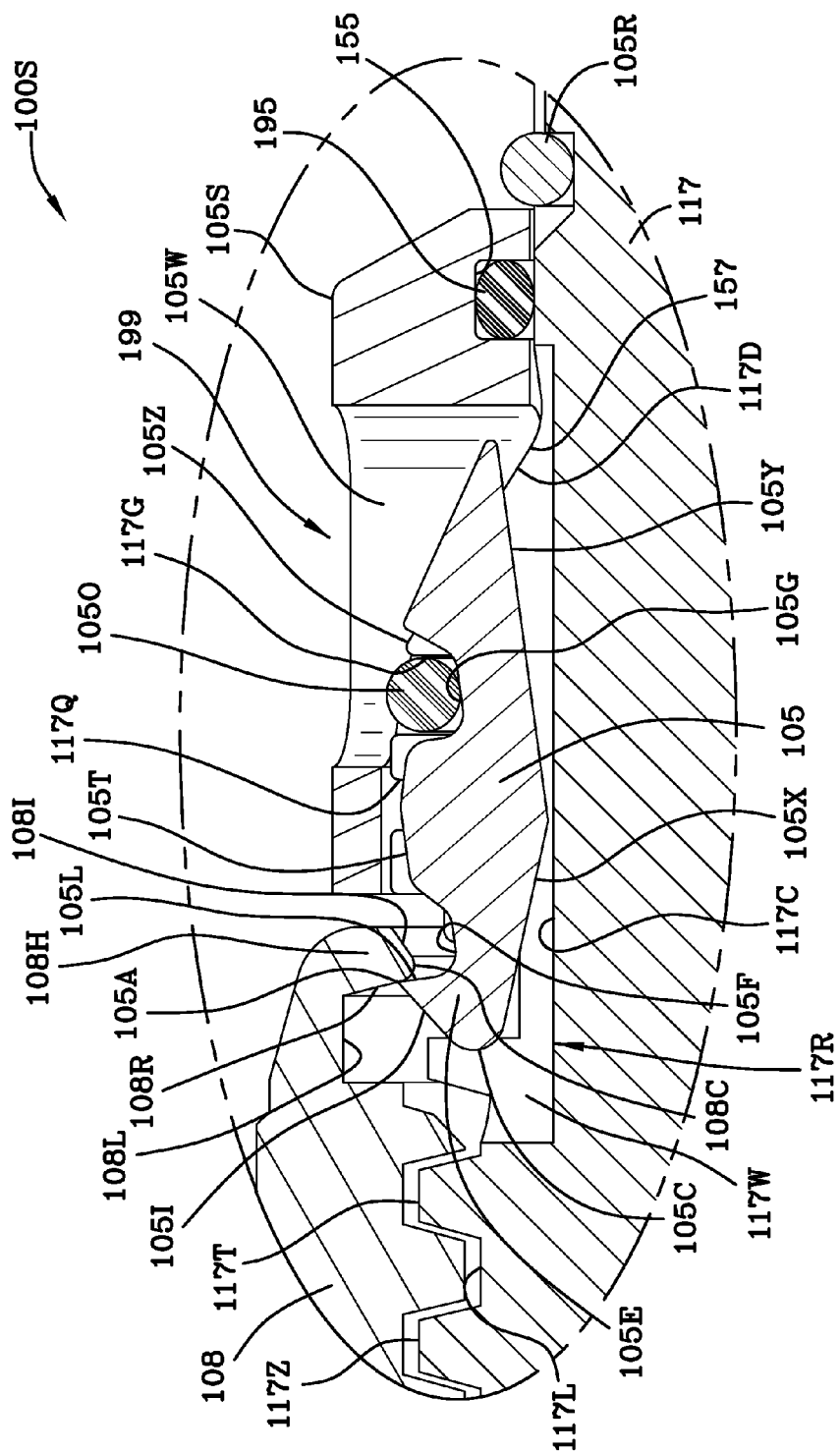
FIG. 1S is a cross-sectional schematic view of a portion of FIG. 1R illustrating the latch end of locking lever partially rotated downwardly and the hook portion of the female sleeve.
Figure 1T:
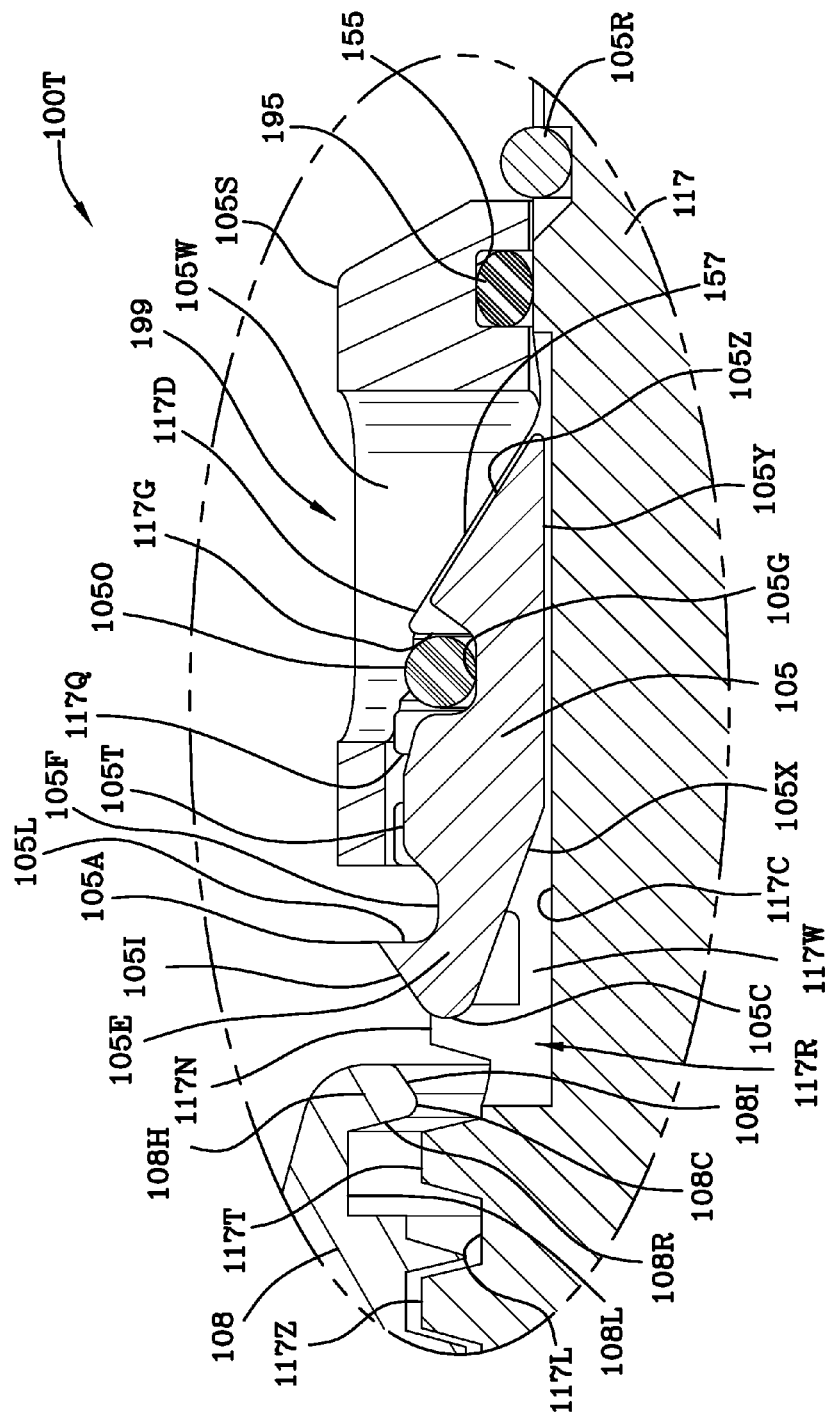
FIG. 1T is a cross-sectional schematic view illustrating the coupling being further along in the unthreading process with the locking lever and the hook portion of the female sleeve disengaged.

FIG. 1R is a top schematic view 100R, of the coupling in the early stage of being unthreaded, that is, the female sleeve is in the process of being unthreaded with respect to the threads of the male body. In FIG. 1R, the access window has been rotated to a position in alignment with the locking lever. FIG. 1S is a cross-sectional schematic view 100S of a portion of FIG. 1R illustrating the latch end 105E of locking lever partially rotated downwardly with the inwardly radially extending portion 108R of the hook portion 108H of the female sleeve engaging the surface 105L of the latch end 105E. Surface 105L is a flat surface that extends from the recess of the locking end to the apex 105A of the latch end 105E. FIG. 1T is a cross-sectional view 100T illustrating the female sleeve 108 being further along in the unthreading process with the locking lever 105 and the hook portion 108H of the female sleeve disengaged.

Figure 2:
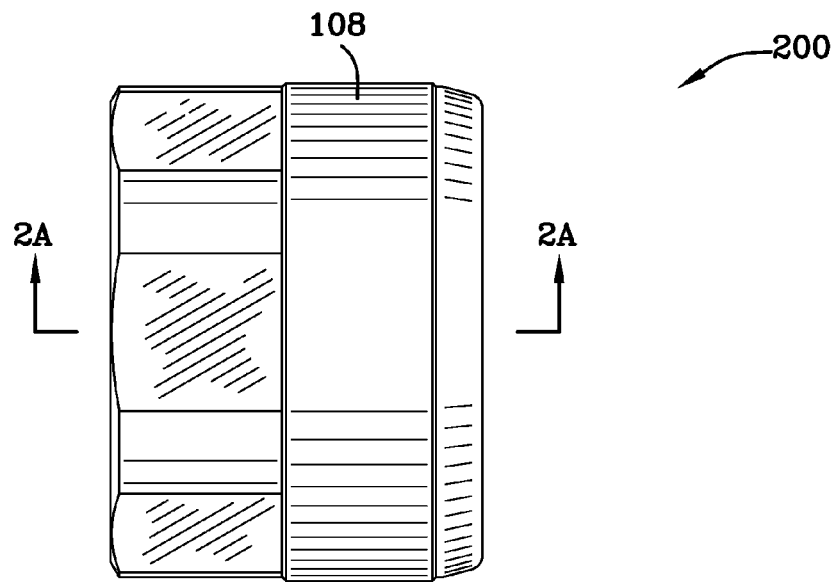
FIG. 2 illustrates a front schematic view of the female sleeve.
Figure 2A:
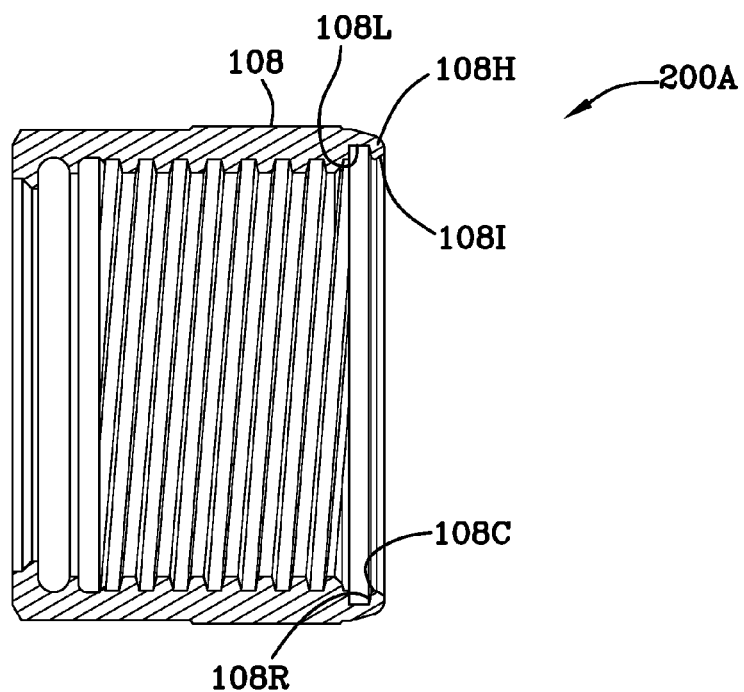
FIG. 2A illustrates a cross-section schematic view of the female sleeve taken along the lines 2A-2A of FIG. 2.

FIG. 2 illustrates a front schematic view 200 of the female sleeve 108 and FIG. 2A illustrates a cross-section schematic view 200A of the female sleeve 108 taken along the lines 2A-2A of FIG. 2. Hook 108H is illustrated in FIGS. 2 and 2A.

Referring to FIG. 1L, a threaded coupling includes a generally cylindrically shaped male coupling half and a generally cylindrically shaped female coupling half. The male coupling half includes a male body 117 and the male body includes an exterior, and the exterior of the male body includes external threads 117Z, 117T, and 117N thereon. See FIG. 3. The female coupling half includes a body 103 and a sleeve 108. See FIGS. 2 and 2A. The female sleeve 108 and the male body 117 are threaded together. The female sleeve further includes an interior and interior of the female sleeve includes internal threads. The external threads of the male body 117Z, 117T are in mating engagement with the internal threads of the female sleeve 108. See FIGS. 1I, 1J, 1K and others. Female sleeve 108 further includes an end portion and the end portion of the female sleeve includes an interior hook 108H formed therein. The male body 117 includes a locking lever receptacle 117R recessed in the exterior of the male body 117, and the locking lever receptacle 117R of the male body further includes first and second slots 117Q, 117P therein. A locking lever 105 includes coaxial first and second pivot pins 105P, a latching end 105E and a sloped end 105Z. The latching end 105E of the latching lever includes a recess 105F and a latching surface 105L. The first and second pivot pins 105Q, 105P of the locking lever reside in the first and second slots 117Q, 117P of the locking lever receptacle 117R of the mate body. The locking lever pivots about the pivot pins as illustrated in FIG. 1K and the locking lever includes an O-ring slot therein.

The male body 117 includes an O-ring 117G slot therein which extends circumferentially around the generally cylindrically shaped male body 117 and is aligned with the O-ring slot 105G in the locking lever. See FIG. 1G. A tensioning O-ring 105O extends circumferentially in the O-ring slot 117G in the male body and in the O-ring slot 105G in the locking lever biasing the latching end 105E of the locking lever to a raised position for engagement with the interior hook 108H formed on the end of the female sleeve 108. The tensioning O-ring 105O secures the locking lever 105 in the receptacle 117R. The latched end 105E of the locking lever 105 is raised for engagement with the interior hook 108H of the female sleeve prior to engagement. See FIG. 1I. During engagement of the female sleeve and the locking lever, the hook 108H of the end of the female sleeve engages the apex 105A of the latching end 105E of the locking lever and the latching end 105E of the locking lever pivots about the first and second pivot pins to a position proximate the receptacle 117R of the male body. See FIG. 1K.

Once the hook 108H, recess 105F of the latching end 105E, and/or the latching end 105E of the locking lever, are fully engaged, the latching end 105E of the locking lever is returned to the raised position under the force of the tensioning O-ring. See FIG. 1N. When the latching end of the locking lever is forced downwardly under the force of the interior or inner hook of the female, the tensioning O-ring is under additional tension and is slightly raised. The tensioning O-ring 105O is under some tension even when the locking lever is not being rotated.

A locking sleeve 105S is employed to ensure that the inner hook 108H of the female sleeve 108 remains engaged with the locking lever 105 which is inserted into the male body. When the locking lever 105 is inserted in the receptacle 117R of the male body 117, the pins 105Q, 105P, the tensioning O-ring 105O, and the locking sleeve 105S secure the locking lever 105 in place against the force of the female sleeve 108 in the event that someone attempts to unthread the female sleeve 108 from the male body inappropriately/improperly or that vibration is attempts to loosen the coupling halves and unthread them.

The locking sleeve 108 is generally cylindrically shaped and engages the exterior of the male body 117 and extends circumferentially thereabout. The locking sleeve resides in proximity with the female sleeve when the male and female halves are fully coupled and when the female sleeve and the male body are fully threaded together, and, the locking sleeve prevents the coupling halves from being unthreaded. The locking sleeve 105S includes an appropriately sized access window 199 or port therethrough which enables latching and unlatching the interior hook 108H of the female sleeve 108 from the male body 117. The appropriately sized access window or port when aligned with the locking lever permits the locking lever to rotate to accomplish either the latching or unlatching of the hook and the recess of the locking lever and, hence, coupling or uncoupling of the female sleeve and the male body. See FIGS. 1I, 1J, 1S and 1T, for example.

The locking lever includes a sloped end 105Z and the interior of the locking sleeve includes reciprocally shaped sloped end 157 which blocks rotation of the locking lever 105 unless the access 199 window or port is aligned with the locking lever 105. The locking sleeve 105S is rotatable from an unlocked position to a locked position where it is not possible to lock or unlock the male body and the female sleeve. See FIGS. 1O and 1P. A second O-ring 195 resides in an O-ring groove 155 in the locking sleeve 105S and is interposed in compression between the locking sleeve and the male body 117. The second O-ring 195 resides in compression in an O-ring groove 155 of the locking sleeve. The second O-ring is in engagement with the exterior of the male coupling and grips the exterior of the male coupling inhibiting unwanted rotation of the sleeve with respect to the exterior of the male body thus preventing inadvertent alignment of the access window with the locking lever.

A process for locking a threaded coupling wherein the coupling includes: a male body having external threads 117Z, 117T and a female sleeve 108 having internal threads; the male body 117 includes an O-ring slot 117G therein, a locking lever receptacle 117R, and, a raised portion 117B, the raised portion 117B includes first and second slots 117Q. 117P; the female coupling further includes an end portion, and, the end portion includes a hook 108H; a locking lever 105, the locking lever includes a latching end 105E having a recess therein 105F, first and second pins 105Q, 105P, an O-ring slot 105G and a sloped end 105Z. The process includes the steps of: inserting the locking lever 105 into the receptacle 117R of the male body 117 and inserting the first and second pins 105Q, 105P of the locking lever 105 into the first and second slots 117Q, 117P of the raised portion 117B of the male body, the first and second pins of the locking lever permitting rotation of the lever about the pins; positioning an O-ring 105O in the O-ring slot 117G of the male body 117 and in the O-ring slot 105G of the locking lever securing the locking lever with respect to the male body, the O-ring permitting rotation of the locking lever about the pins with resistance to the rotation; and, progressively threading the female coupling having internal threads onto the male body having external threads moving the hook longitudinally toward the locking lever; engaging the hook 108H and the latching end 105E of the locking lever, and as the progressive threading continues, the hook 108H moving and forcing the locking lever 105 to rotate the latching end thereof radially downwardly toward the male body; extending the hook 108H of the female sleeve 108 longitudinally further until the hook 108H proceeds into the recess 105F of the locking lever and the locking lever rotates the latching end thereof upwardly; and, interengaging the hook of the female sleeve and the recess of the locking lever securing the male body and the female sleeve together; locking the interengaged hook of the female member and the recess of the latching end of the locking lever together using a locking sleeve; positioning the locking sleeve between the hook of the female member and a snap ring affixed in the male member; inhibiting rotation of the locking sleeve against unwanted rotation of the locking sleeve by vibration by interposing a second O-ring between the male body and the sleeve such that force is required to rotate the locking sleeve with respect to the male portion.

The locking lever 105 includes a bottom surface 105X, 105Y and the lever receptacle 117R includes a flat surface. The bottom surface 105X, 105Y of the locking lever is spaced apart from the flat surface 117C of the receptacle 117R thus enabling the locking lever to pivot without engagement with the flat surface 117C of the receptacle. The locking lever pivots about the coaxial pins 105Q, 105P during engagement of the lever with the interior hook 108H of the female sleeve 108.

REFERENCE NUMERALS

100—perspective view of coupling partially threaded together
100A—top view of the coupling partially threaded together
100B—cross-sectional view of the coupling partially threaded together taken along the lines 1A-1A
100C—perspective view of the locking lever
100D—top view of the locking lever
100E—left side view of the locking lever
100F—bottom side view of the locking lever
100G—perspective view of the mate body with external threads and the locking lever mounted in locking lever receptacle for the locking lever and an O-ring groove therein
100H—right side view of the locking lever
100I—enlarged portion of FIG. 1B illustrating the female sleeve being threadingly engaged with the male body and with the interior hook of end portion of the female sleeve approaching the locking lever
100J—cross-sectional view of the interior hook of the female sleeve engaging the locking lever
100K—cross-sectional view of the interior hook of the female sleeve engaging the apex of the locking lever 100L—top view of the coupling fully threaded together with the locking sleeve and access window in the locking sleeve
100M—cross-section view of the coupling fully threaded together taken along the lines 1M-1M of FIG. 1L
100N—enlargement of a portion of FIG. 1M
100O—top view of the coupling fully threaded together with the locking sleeve rotated such that the access window is not viewed
100P—cross-sectional view of the coupling taken along the lines 1P-1P of FIG. 1O
100Q—enlarged portion of FIG. 1P
100R—top view of the coupling in the early stage of being unthreaded
100S—cross-sectional view of a portion of FIG. 1R illustrating the latch end of locking lever partially rotated downwardly and the hook portion of the female sleeve
100T—cross-sectional view illustrating the coupling being further along in the unthreading process with the locking lever and the hook portion of the female sleeve disengaged
101—female adaptor
103—female body threaded to female adaptor 101
105—locking lever
105A—apex of locking lever
105C—rounded portion of inclined latching end 105I
105F—latching recess
105G—groove for O-ring 105O
105I—inclined latching end of locking lever
105L—latching surface
105M—side wall of locking lever 105
105O—O-ring which biases the lever such that the latching end is raised when not engaged
105P, 105Q—pin
105R—snap ring preventing longitudinal movement of sleeve 105S
105S—rotating sleeve which ensures that the locking lever is kept in place
105T—top of locking lever 105
105W—side wall of locking sleeve
105X—latching end bottom surface
105Y—sloped end bottom surface
105Z—sloped end
106—seal
107—detents residing between threaded female sleeve 108 and female body 103
108—female sleeve with threaded interior and hook
108C—curved surface of hook
108H—hook on interior of female sleeve
108I—inclined surface of hook 108H
108L—recess of thread of female sleeve
108R—radially extending surface to recess 108L
110—snap ring
113—adaptor of mate body 117
117—male body having exterior threads and a receptacle for the locking lever and O-ring which biases the latching end portion of the locking lever upwardly
117B—flat upper surface of male body 117
117C—flat bottom of locking lever receptacle
117D—sloping surface of male body 117
117G—O-ring groove in the male body 117
117L—groove between thread 117T and thread 117Z
117N—thinner thread of the male body
117R—locking lever receptacle
117Q, 117P—receptacles in male body 117 for pins 105Q, 105P
117T, 117Z—thread of male
117W wall in male body
155—groove in locking sleeve for second O-ring that is in compression
157—slope of the inner portion of the locking sleeve which is reciprocal to the slope of sloped portion 105Z of the locking lever;
195—second O-ring which provides friction for sleeve 105S
199—access window or port for permitting threading or unthreading
200—top view of female coupling half
200A—cross-sectional view of FIG. 2 of female coupling half taken along the lines 2A-2A
300—top view of male body
300A—cross-sectional view of FIG. 3 of the male body taken along the lines 3A-3A of FIG. 3
400—top view of locking sleeve with the access window or port illustrated
400A—cross-sectional view of FIG. 4 taken along the lines 4A-4A The invention has been set forth with particularity. Those skilled in the art will readily understand that changes may be made to the invention without departing from the spirit and scope of the claims set forth below.

The invention claimed is:
1. A threaded coupling, comprising:
a generally cylindrically shaped male coupling half;
a generally cylindrically shaped female coupling half;
said male coupling half includes a male body, said male body includes an exterior, and said exterior of said male body includes external threads thereon;
said female coupling half includes a female sleeve and a female body, said female sleeve moves said female body toward said male body during threaded engagement of said female coupling half and said male coupling half;
said interior of said female sleeve includes internal threads;
said external threads of said male body in mating engagement with said internal threads of said female sleeve;
said female sleeve further includes an end portion;
said end portion of said female sleeve includes an interior hook formed therein;
said male body includes a locking lever receptacle recessed in said exterior of said male body, and said locking lever receptacle of said male body further includes first and second slots therein;
a locking lever;
said locking lever includes first and second pivot pins, said locking lever includes a latching end;
said latching end of said latching lever includes a recess and a latching surface;
said first and second pivot pins of said locking lever reside in said first and second slots of said locking lever receptacle of said male body, said locking lever pivoting about said pivot pins;
said locking lever includes an O-ring slot therein;
said male body includes an O-ring slot therein which extends circumferentially around said generally cylindrically shaped male body and aligned with said O-ring slot in said locking lever;
a tensioning O-ring, and said tensioning O-ring extending circumferentially in said O-ring slot in said male body and in said O-ring slot in said locking lever biasing said latching end of said locking lever to a raised position for engagement with said interior hook formed on said end of said female sleeve, and, said tensioning O-ring securing said locking lever in said locking lever receptacle;
said latched end being raised for engagement with said interior hook of said female sleeve prior to engagement;

during engagement, said hook of said end of said female sleeve engages said recess of said latching end of said locking lever, and, said latching end of said locking lever pivots about said first and second pivot pins to a position proximate said receptacle of said male body;

once said hook and said recess of said locking lever are fully engaged, said latching end of said locking lever is returned to said raised position;

a locking sleeve, said locking sleeve being generally cylindrically shaped engages said exterior of said male body and extends circumferentially thereabout, and, said female sleeve are fully threaded together, and, said locking sleeve preventing said female sleeve and said male body from being unthreaded.

2. A threaded coupling as claimed in claim 1, wherein said locking sleeve includes an access window which allows said coupling to be unlocked and uncoupled when said access window is located proximate said locking lever.

3. A threaded coupling as claimed in claim 1, wherein said locking sleeve includes a groove which retains a second O-ring therein, said second O-ring in engagement with said exterior of said male coupling and gripping said exterior of said male coupling inhibiting unwanted rotation of said sleeve with respect to said male body thus preventing inadvertent alignment of said access window with said locking lever.

4. A threaded coupling as claimed in claim 1, wherein:
said latching end of said locking lever includes an exterior hook engagement surface;
said hook of said end portion of said female sleeve includes an exterior surface; and,
during engagement, said exterior surface of said hook of said end portion of said female sleeve engages said exterior hook engagement surface of said latching end of said locking lever pivoting said locking lever, allowing said hook to engage said recess of said latching end of said locking lever locking said coupling together.

5. A threaded coupling as claimed in claim 4, wherein:
said exterior hook engagement surface of said latching end of said locking lever is inclined at a first angle and said exterior of said hook of said end portion of said female sleeve is inclined and arranged at approximately said first angle;
during coupling, said exterior of said hook slidingly engages said hook engagement surface of said latching end of said locking lever pivoting said locking lever against the force of said tensioning O-ring such that said latching end of said locking lever is brought into proximity of said locking lever receptacle of said male body; and,
said hook of said end portion of said female sleeve includes an interior portion, said interior portion of said hook includes a latching surface and a land surface, and, said latching surface extending generally radially outwardly to said land surface.

6. A threaded coupling as claimed in claim 1, further comprising:
a snap ring;
a snap ring receptacle in said male body;
said snap ring resides in said male body and secures said locking sleeve.

7. A threaded coupling as claimed in claim 1, further comprising:
said locking lever includes a bottom surface;
said bottom surface includes a latching end portion and a sloped end portion;

said latching end portion bottom surface being inclined with respect to said locking lever receptacle in said male body when said tensioning O-ring resides in said O-ring slot of said locking lever and said O-ring slot of said male body; and,
said sloped end portion of said bottom surface being parallel to and in proximity to said locking lever receptacle.

8. A threaded coupling as claimed in claim 1, wherein:
said locking lever includes a bottom surface;
said bottom portion of said locking lever being spaced apart from said locking lever receptacle; and,
said locking lever being rotatable about said first and second pivot pins without said locking lever engaging said locking lever receptacle of said male body.

9. A threaded coupling as claimed in claim 8, further comprising:
said bottom surface includes a latching end portion and a sloped end portion;
said latching end portion of said bottom surface inclined with respect to said locking lever receptacle in said male body when said tensioning O-ring resides in said O-ring slot of said locking lever and said O-ring slot of said male body; and,
said sloped end portion of said bottom surface being parallel to and in proximity to said locking lever receptacle.

10. A threaded coupling as claimed in claim 1, wherein:
said locking lever includes a bottom surface;
said bottom surface of said locking lever being spaced apart from said locking lever receptacle;
said bottom surface includes a latching end portion and a sloped end portion;
said latching end portion of said bottom surface being inclined with respect to said locking lever receptacle in said male body when said tensioning O-ring resides in said O-ring slot of said locking lever and said O-ring slot of said male body;
said sloped end portion of said bottom surface being parallel to and in proximity to said locking lever receptacle;
said latching end portion of said bottom surface being planar and said sloped end portion of said bottom surface being planar and intersect each other along a line of intersection;
said first and second pins being coaxial with respect to one another, said coaxial pins sharing an axis;
a radius from said axis of said pins to said line of intersection; and,
said radius being smaller than said distance from said axis of said pins to said locking lever receptacle when said first and second pin reside in said first and second slots of said receptacle.

11. A threaded coupling as claimed in claim 1, wherein:
said locking lever receptacle of said male body includes a flat bottom surface;
said locking lever receptacle includes a first side wall, a second side wall, a first end wall and a second end wall;
said male body includes a raised portion; and,
said raised portion includes said first and second slots which receive said first and second pins of said locking lever.

12. A threaded coupling as claimed in claim 1, wherein:
said locking sleeve includes an interior portion, said interior portion includes a contour engaging said locking lever and which locks said locking lever against rotation when said contour of said locking sleeve is positioned adjacent said locking lever.

13. A threaded coupling, comprising:
a generally cylindrically shaped male coupling half;

a generally cylindrically shaped female coupling half;

said male coupling half includes a male body, said male body includes an exterior, and said exterior of said male body includes external threads thereon;

said female coupling half includes a female body and a female sleeve, said female sleeve includes an interior;

said interior of said female sleeve further includes internal threads therein;

said external threads of said male body in mating engagement with said internal threads of said female sleeve;

said female sleeve further includes an end portion;

said end portion of said female sleeve includes an interior hook formed therein;

said male body includes a locking lever receptacle recessed in said exterior of said male body, and said receptacle of said male body further includes first and second slots therein;

a locking lever;

said locking lever includes first and second pivot pins, said locking lever includes a latching end;

said latching end of said locking lever includes a recess;

said first and second pivot pins of said locking lever reside in said first and second slots of said receptacle of said male body, said locking lever pivoting about said pivot pins;

said locking lever includes an O-ring slot therein;

said male body includes an O-ring slot therein which extends circumferentially around said generally cylindrically shaped male body and aligned with said O-ring slot in said locking lever;

a tensioning O-ring, and said tensioning O-ring extending circumferentially in said O-ring slot in said male body and in said O-ring slot in said locking lever biasing said latching end;

during engagement: said latching end of said locking lever pivots about said first and second pivot pins to a position proximate said receptacle of said male coupling; and, said hook of said female end engages said recess of said latching end of said locking lever, and, once said hook and said recess of said locking lever are fully engaged, said latching end of said locking lever is returned to a raised position.

14. A threaded coupling as claimed in claim 13, further comprising:

a locking sleeve, said locking sleeve being generally cylindrically shaped and engages said exterior of said male body and extends circumferentially thereabout; and, said locking sleeve preventing said female sleeve and said male body from being unthreaded.

15. A threaded coupling as claimed in claim 13, further comprising:

a locking sleeve, said locking sleeve being generally cylindrically shaped and engages said exterior of said male body and extends circumferentially thereabout;

said locking sleeve includes an access window which allows threading and unthreading of said male body and said female sleeve when said access window is aligned with said locking lever so as to permit rotation of said locking lever about said first and second pins; and, said locking sleeve includes an interior portion, said interior portion includes a contour which engages said lever and which locks said locking lever against rotation when said contour of said locking sleeve is positioned adjacent said locking lever.

16. A threaded coupling as claimed in claim 13, further comprising:

a locking sleeve, said locking sleeve being generally cylindrically shaped and engages said exterior of said male body and extends circumferentially thereabout; and, said locking sleeve includes an interior portion, said interior portion includes a contour which engages said end of said lever and which locks said locking lever against rotation when said contour of said locking sleeve is positioned adjacent said end of said locking lever.

\* \* \* \* \*